US009713043B2

(12) United States Patent
Park et al.

(10) Patent No.: US 9,713,043 B2
(45) Date of Patent: *Jul. 18, 2017

(54) ELECTRONIC DEVICE AND A METHOD OF OPERATING THE SAME

(71) Applicant: LG ELECTRONICS INC., Changwon, Gyoungsangnam-do (KR)

(72) Inventors: Jihwan Park, Seoul (KR); Taenyon Kim, Seoul (KR)

(73) Assignee: LG ELECTRONICS INC., Changwon, Gyoungsangnam-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/143,899

(22) Filed: May 2, 2016

(65) Prior Publication Data

US 2016/0269946 A1 Sep. 15, 2016

Related U.S. Application Data

(63) Continuation of application No. 14/352,962, filed as application No. PCT/KR2011/007911 on Oct. 21, 2011, now Pat. No. 9,379,779.

(51) Int. Cl.
*H04B 5/00* (2006.01)
*H04W 28/18* (2009.01)
(Continued)

(52) U.S. Cl.
CPC ...... *H04W 36/0055* (2013.01); *H04B 5/0031* (2013.01); *H04W 36/14* (2013.01);
(Continued)

(58) Field of Classification Search
CPC ...... H04L 67/36; H04W 48/18; H04W 4/008; H04B 5/0025
See application file for complete search history.

(56) References Cited

U.S. PATENT DOCUMENTS 7,225,260 B2   5/2007  Herrod
8,355,748 B2   1/2013  Abe et al.
(Continued)

FOREIGN PATENT DOCUMENTS

KR   10-2009-0034780 A   4/2009
KR   10-2009-0122968 A   12/2009

*Primary Examiner* — Cindy Trandai
(74) *Attorney, Agent, or Firm* — Birch, Stewart, Kolasch & Birch, LLP

(57) ABSTRACT

A method of operating a first electronic device, the method including receiving an identifier of a second electronic device from the second electronic device via a communication link formed by a first communication carrier; checking whether the second electronic device is pre-registered based on the received identifier of the second electronic device; transmitting, when the second electronic device is not pre-registered according to a result of the checking, a first handover request message including alternative carriers to the second electronic device, wherein the alternative carriers are supported by the first electronic device and are listed by priority in the first handover request message; receiving a handover selection message including a second communication carrier, wherein the second communication carrier is supported by the second electronic device and is selected among the alternative carriers; forming a communication link with the second electronic device through the second communication carrier; and storing the second communication carrier matching with the second electronic device.

14 Claims, 20 Drawing Sheets

(51) Int. Cl.
*H04W 36/00* (2009.01)
*H04W 36/14* (2009.01)
*H04W 72/04* (2009.01)
*H04W 72/10* (2009.01)
*H04W 84/18* (2009.01)
*H04W 4/00* (2009.01)

(52) U.S. Cl.
CPC ....... *H04W 72/0453* (2013.01); *H04W 72/10* (2013.01); *H04W 4/008* (2013.01); *H04W 84/18* (2013.01)

(56) References Cited

U.S. PATENT DOCUMENTS

| | | | |
|---|---|---|---|
| 2002/0147819 A1* | 10/2002 | Miyakoshi | H04L 29/06 709/228 |
| 2002/0160765 A1* | 10/2002 | Okajima | H04B 1/406 455/419 |
| 2003/0065784 A1 | 4/2003 | Herrod | |
| 2006/0015636 A1 | 1/2006 | Skraba et al. | |
| 2006/0075090 A1 | 4/2006 | Bocking et al. | |
| 2007/0001853 A1* | 1/2007 | Otranen | G06K 7/0008 340/572.1 |
| 2007/0157106 A1* | 7/2007 | Bishop | H04L 67/36 715/771 |
| 2007/0168553 A1 | 7/2007 | Jones et al. | |
| 2008/0065877 A1* | 3/2008 | Son | H04L 63/0428 713/151 |
| 2008/0155132 A1* | 6/2008 | Kato | G06F 9/4411 710/16 |
| 2008/0181187 A1 | 7/2008 | Scott et al. | |
| 2008/0222711 A1 | 9/2008 | Michaelis | |
| 2009/0013048 A1* | 1/2009 | Partaker | G06Q 10/107 709/206 |
| 2009/0066998 A1* | 3/2009 | Kato | G01C 21/26 358/1.15 |
| 2009/0104875 A1 | 4/2009 | Naniyat | |
| 2009/0111378 A1* | 4/2009 | Sheynman | H04W 8/005 455/41.1 |
| 2009/0164300 A1 | 6/2009 | Gupta et al. | |
| 2011/0177780 A1* | 7/2011 | Sato | H04W 36/14 455/41.1 |
| 2012/0295540 A1 | 11/2012 | Hong et al. | |
| 2013/0023258 A1* | 1/2013 | Choi | H04M 1/7253 455/418 |
| 2013/0267172 A1* | 10/2013 | Ko | H04B 5/0031 455/41.1 |
| 2013/0312062 A1* | 11/2013 | Kuwabara | H04W 4/001 726/3 |
| 2014/0125575 A1* | 5/2014 | Samanta Singhar | G06F 3/005 345/156 |
| 2015/0155916 A1* | 6/2015 | Kuo | G06F 3/041 455/41.1 |

\* cited by examiner

Fig. 20

| Device | Connection means |
|---|---|
| TV | Blutooth |
| Tablet 1 | Wi-Fi |
| Tablet 2 | Blutooth |
|  | Wi-Fi |
| NAS | Wi-HD |
| ⋮ | ⋮ |

Fig. 24

| Device | Connection means | application |
|--------|------------------|-------------|
| TV | Blutooth | Photo album |
| Tablet 1 | Wi-Fi | Joystick app |
| Tablet 2 | Blutooth | Music album |
| | Wi-Fi | Video album |
| NAS | Wi-HD | Video album |
| ⋮ | ⋮ | ⋮ |

ELECTRONIC DEVICE AND A METHOD OF OPERATING THE SAME

CROSS REFERENCE TO THE RELATED APPLICATIONS

This application is a Continuation of co-pending application Ser. No. 14/352,962, filed on Apr. 30, 2014, which is the National Phase of PCT International Application No. PCT/KR2011/007911, filed on Oct. 21, 2011, all of which are hereby expressly incorporated by reference into the present application.

BACKGROUND OF THE INVENTION

Field of the Invention

The present invention concerns NFC electronic device that may form NFC link and a method of operating the NFC electronic device. More specifically, the present invention relates to a handover method that changes NFC link formed between NFC electronic devices to an alternative communication link.

Discussion of the Related Art

NFC (Near Field communication) is a very short-range contactless data transfer technology relating to RFID (radio frequency identification) and may be used for communication between devices spaced apart from each other within a distance of 10 cm or less (preferably, 4 cm or less).

NFC uses a center frequency of 13.56 MHz and may offer transmit speeds such as 106, 212, and 424 kbps. NFC may be compatible with various contactless communication protocols. For example, NFC may provide compatibility with the protocols defined in ISO 14443 types A, B, and F and ISO 18092.

NFC may be combined with various applications, for example, home networking, smart poster, or bus ticketing.

An electronic device adopting the NFC technology may communicate with other devices also adopting the NFC technology through at least one of, e.g., a reader mode, a card emulation mode, and a peer-to-peer mode.

SUMMARY OF THE INVENTION

An object of the present invention is to provide a method of being able to form a near-field communication link between electronic devices more easily using a handover process that switches an NFC link to an alternative communication link.

The foregoing and other objects of the present invention will be apparent to one of ordinary skill in the art from the detailed description of embodiments of the present invention.

According to an aspect of the present invention, there is provided a method of operating a first electronic device, the method comprising receiving an identifier of second electronic device from the second electronic device via a communication link formed by a first communication carrier; determining whether the second electronic device is pre-registered based on the received identifier of the second electronic device; and displaying a user interface for selecting a second communication carrier that is to be formed with the second electronic device when the second electronic device is not pre-registered according to a result of the determination.

At this time, the second communication carrier selected through the displayed user interface may be stored, wherein the second communication carrier is matched the second electronic device.

The displayed user interface may include a list of all types of communication carriers supported by the electronic device and the second electronic device. At this time, the list is configured to vary depending on a priority assigned to the communication carrier.

Further, the priority assigned to the communication carrier may be determined depending on an application that is being executed on the electronic device. Meanwhile, the priority assigned to the communication carrier may be determined depending on the number of times by which the communication carrier was used for forming a communication link.

A communication link with the second electronic device may be formed through the second communication carrier selected through the user interface.

When the second electronic device is not pre-registered according to the result of the determination, a second user interface for selecting an application to be interoperating with the second electronic device may be further displayed. At this time, the application selected through the displayed second user interface may be stored, wherein the application is matched the second electronic device.

The displayed user interface may contain a list including at least one of candidate application of applications installed in the first electronic device. At this time, the at least one of candidate application may be determined depending on an attribute of the second electronic device, or the candidate application may be determined depending on an attribute of the second communication carrier selected through the user interface.

A communication link formed by the first communication carrier may be a near-field communication link formed by tagging between the electronic device and the second electronic device.

According to another aspect of the present invention, there is provided a first electronic device comprising a communication unit for communicating with second electronic device; a storage unit configured to store information; a display unit configured to display information; and a controller configured to receive an identifier of the second electronic device from the second electronic device via a communication link formed in the communication unit by a first communication carrier, determine whether the second electronic device is a pre-registered electronic device based on the received identifier of the second electronic device and the information stored in the storage unit, and when the second electronic device is not pre-registered according to a result of the determination, display on the display unit a user interface for selecting a second communication carrier that is to be formed with the second electronic device. At this time, the controller may be configured to store in the storage unit the second communication carrier selected through the displayed user interface, wherein the second communication carrier is matched the second electronic device.

The controller may be configured to control the communication unit to form a communication link with the second electronic device via the selected second communication carrier.

The controller may be configured to control the display unit to further display a second user interface for selecting an application to be interoperating with the second electronic device when the second electronic device is not pre-registered according to the result of the determination.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 20 illustrates a table in which an identifier of an electronic device and its associated alternative carrier match each other according to the fifth embodiment of the present invention.

FIG. 24 illustrates a table in which an identifier of an electronic device and its associated alternative carrier match each other according to the sixth embodiment of the present invention.

DETAILED DESCRIPTION

The foregoing objects, features, and advantages of the present invention will be more apparent from the following detailed description in conjunction with the accompanying drawings. Hereinafter, embodiments of the present invention will be described with reference to the accompanying drawings. The same reference numbers are used to denote the same elements throughout the specification and the drawings. When determined to make the subject matter of the present invention unnecessarily unclear, the detailed description of known functions or configurations related to the present invention will be skipped.

Figure 1:
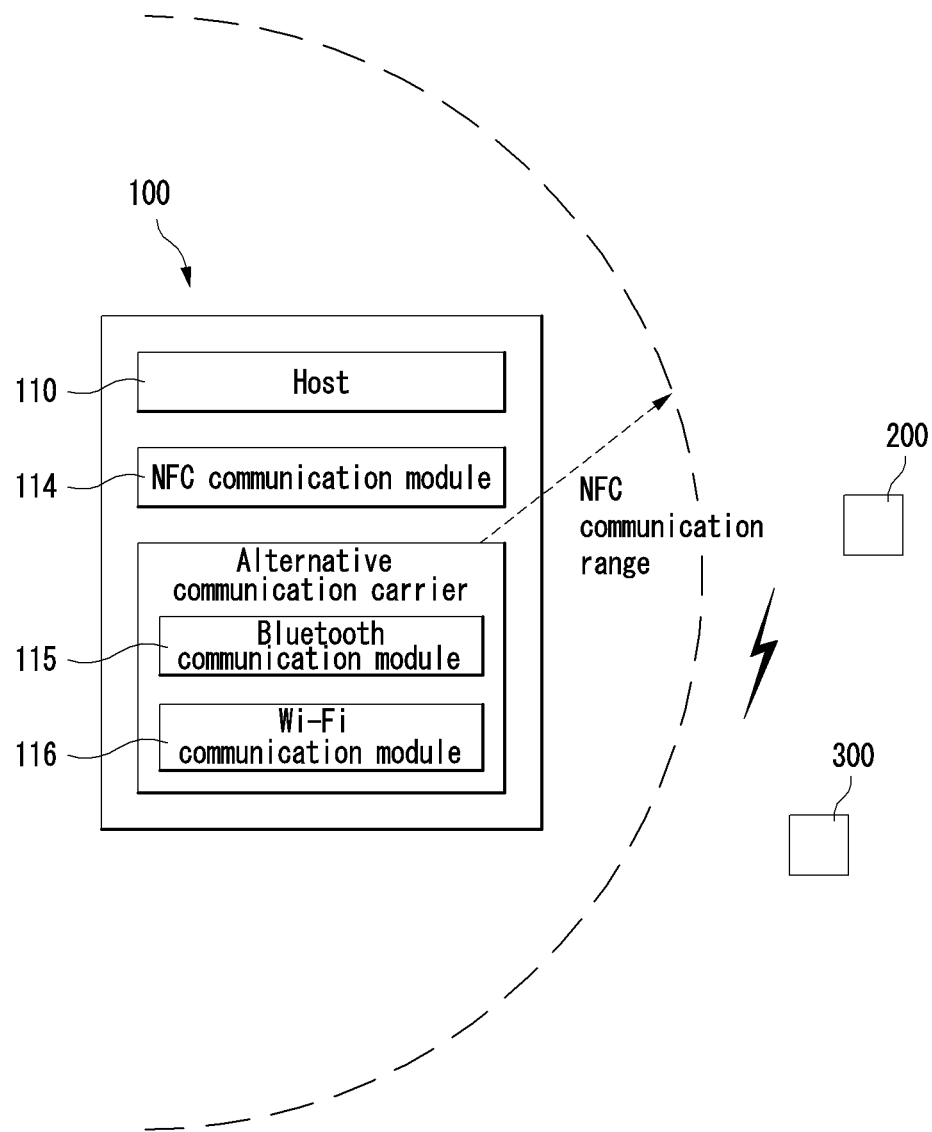
FIG. 1 illustrates a system environment according to an embodiment of the present invention.

FIG. 1 shows a system environment according to an embodiment of the present invention.

The system environment according to an embodiment of the present invention may include one or more NFC (near field communication) electronic devices that may form an NFC link.

Referring to FIG. 1, the system environment according to an embodiment of the present invention may include one or more electronic devices 100, 200, and 300. These are not essential elements, and thus, more or less elements may be included. As used herein, the electronic devices 100, 200, and 300 denote any electronic devices that support NFC communication, for example, NFC communication-supportive mobile data processing devices (e.g., cellular phones, smartphones, e-book readers), printers, TVs, DTVs, computers, tablet PCs, audio devices or other various electronic devices. These are merely examples of the electronic devices 100, 200, and 300, and more various types of devices may be included. Hereinafter, an electronic device may be called an NFC electronic device.

The electronic device 100, as shown in FIG. 1, may include a host 105, an NFC communication module 114, and one or more alternative communication carrier modules.

The host 105 may function as a processor that controls the components in the electronic device 100. For example, the host 105 may output and/or receive various signals for controlling one or more alternative communication carriers and the NFC communication module 114 shown in FIG. 1. Hereinafter, the host 105 may be called a processor or a controller.

The NFC communication module 114 may enable the electronic device 100 to form an NFC link with other electronic devices 200 and 300 that support NFC communication. The NFC communication module 114 may refer to an NFC forum device. As used herein, the NFC communication module may be referred to as a near-field communication means.

The NFC communication module 114 may form an NFC link through tagging with an NFC communication module of another electronic device in an NFC communication range as shown in FIG. 1.

The NFC communication module 114 may communicate with the NFC communication modules of other electronic devices 200 and 300 in various modes. For example, the various modes may include a card emulation mode, a reader mode, and a peer-to-peer mode.

In case the NFC communication module 114 operates in the card emulation mode, the NFC communication module 114 of the electronic device 100 may function as, a so-called tag. In this case, the NFC communication modules of the other electronic devices may operate in the reader mode, thus obtaining data from the NFC communication module 114 of the electronic device 100.

In case the NFC communication module 114 operates in the reader mode, the NFC communication module 114 of the electronic device 100 may function as a reader. In this case, the NFC communication module 114 of the electronic device 100 may obtain data from the NFC communication modules of the other electronic devices that operate in the emulation mode.

In case the NFC communication module 114 operates in the peer-to-peer mode, the NFC communication module 114 of the electronic device 100 and the NFC communication module of another electronic device may exchange data from each other.

The mode of the NFC communication module 114 may be determined based on a predetermined reference. For example, the mode of the NFC communication module 114 may be set in response to a user's entry or based on a predetermined algorithm.

The alternative communication carrier refers to a communication technique that may be used for data transmission between electronic devices, and the alternative communication carrier may contain various communication modules other than NFC communication carriers. For example, the alternative communication carrier, as shown in FIG. 1, may include at least one of a Bluetooth (802.15.1 IEEE) communication module 115 and a Wi-Fi (Wireless Fidelity) communication module 116. Besides, the alternative communication carrier may contain various communication means such as an RFID (radio frequency identification) or WiGig (Wireless Gigabit) communication module, and may include communication means to be implemented in the future, as well as the conventional communication means. Hereinafter, the alternative communication carrier may be also referred to as an alternative carrier or alternative communication means.

Although not shown, the electronic devices 200 and 300 may have a configuration corresponding to the electronic device 100. That is, the electronic devices 200 and 300 may contain a host, an NFC communication module, and an alternative communication carrier.

For ease of description, the electronic device 100 is referred to as a first electronic device 100, the electronic device 200 as a second electronic device 200, and the electronic device 300 as a third electronic device 300, as necessary.

The electronic device 100 may form an NFC link with another electronic device through the NFC communication module 114 and then may form a communication link of a different type from that of the NFC link, thereby continuing to conduct data communication with the other electronic device. As used herein, a series of processes in which, after an NFC link is formed, the electronic device and the other electronic device form a link using the alternative communication carrier so that the electronic device and the other electronic device can keep communicating with each other through the alternative communication carrier is referred to as handover.

In other words, the handover enables the electronic device 100 and the other electronic device to form an NFC link and to then form a link with an alternative communication carrier, thereby conducting data communication, so that a user may easily establish an NFC link between the electronic device 100 and the other electronic device through NFC tagging and may then switch the communication means from the NFC link to the alternative communication carrier that is appropriate for more distant and/or high-capacity data transmission.

Hereinafter, handover according to an embodiment of the present invention is described in greater detail with reference to the accompanying drawings. For convenience of description, the system environment shown in FIG. 1 is referenced. However, this is merely for ease of description, and the technical scope of the present invention is not limited to such a specific environment or device.

Figure 2:
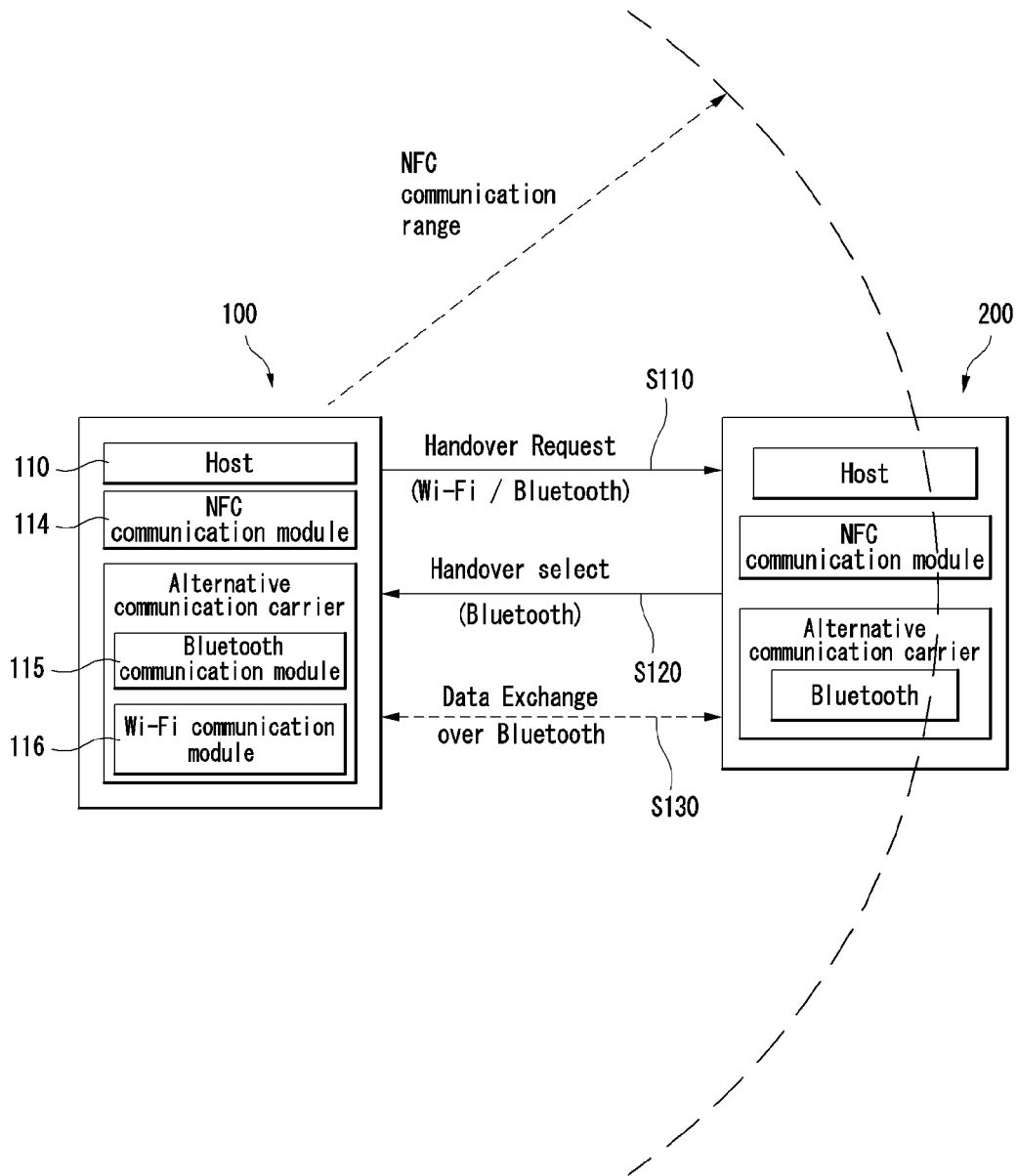
FIG. 2 is a view illustrating handover according to a first embodiment of the present invention.

FIG. 2 is a view illustrating handover according to a first embodiment of the present invention.

Referring to FIG. 2, the first electronic device 100 may send a handover request message to the second electronic device 200 (S110).

Prior to step S110, the first electronic device 100 and the second electronic device 200 may form a communication link through a first communication means. For example, the first electronic device 100 may form an NFC link with the second electronic device 200 through tagging.

The first electronic device 100 may send a message for requesting handover, e.g., the handover request message, to the second electronic device 200 through the NFC link with the NFC link established.

The first electronic device 100 may initiate a protocol for forming another communication link with the second electronic device 200 through the NFC link currently formed between the first electronic device 100 and the second electronic device 200 by sending the handover request message to the second electronic device 200.

Specific information contained in the handover request message will be described below. Here, the first electronic device 100 may serve as a handover requester, and the second electronic device 200 may serve as a handover selector. The handover requester means a device that initiates a handover protocol by sending a handover request message to other NFC electronic device, and the handover selector means an NFC device that configures a handover selection message in response to the received handover request message and responds with the handover selection message. In other words, the handover requester (i.e., the device requesting handover) and the handover selector (i.e., the device selecting handover) have relative concepts as determined depending on whether they transmit a handover request message or a handover selection message. Accordingly, depending on circumstances, in case the second electronic device 200 sends a handover request message to the first electronic device 100, the first electronic device 100 may be the handover selector, and the second electronic device 200 may be the handover requestor.

The handover request message may contain information relating to an alternative carrier supported by the first electronic device 100. For example, as shown in FIG. 1, the first electronic device 100 supports Bluetooth and Wi-Fi, and thus, the handover request message may contain information on Bluetooth and Wi-Fi supported by the first electronic device 100. A specific data format contained in the handover request message is to be described below. A plurality of alternative carriers may be assigned priorities. For example, as shown in FIG. 2, the handover request message may put information on an alternative carrier having a higher priority ahead, while placing information on an alternative carrier having a lower priority behind. Referring the handover request message shown in FIG. 2, the alternative carrier, Wi-Fi, is seen to have a higher priority than Bluetooth. Or, a separate field having a priority for each carrier may be provided.

When receiving the handover request message, the second electronic device 200 may send a response to the handover request message to the first electronic device 100 (S120).

For example, the second electronic device 200 may generate a handover selection message as an example of the response to the handover request message and may send the generated handover selection message to the first electronic device 100 through the NFC link.

The second electronic device 200 may determine an alternative carrier supported by the second electronic device 200 among the alternative carriers contained in the handover request message, and based on the determination, the second electronic device 200 may offer information on the alternative carrier supported by the second electronic device 200 to the first electronic device 100. That is, the alternative carrier included in the handover selection message may contain information on the alternative carrier supported by the second electronic device 200 among the alternative carriers supported by the first electronic device 100.

As shown in FIG. 2, the second electronic device 200 supports Bluetooth, but not Wi-Fi, as an alternative carrier.

In this case, the handover selection message may contain information on a Bluetooth communication module supported by the second electronic device 200 as information on the alternative carrier.

Details of the information contained in the handover selection message are given below.

The first electronic device 100 may conduct data communication with the second electronic device 200 via an alternative carrier (S130).

For this purpose, the first electronic device 100 may obtain information on an alternative carrier supported by the second electronic device 200 by receiving the handover selection message from the second electronic device 200. For example, the first electronic device 100 may confirm that the obtained alternative carrier supported by the second electronic device 200 is Bluetooth.

Accordingly, the first electronic device 100 may perform a series of processes for handover to the second electronic device 200 based on the information obtained as the handover request message and the handover selection message are transmitted and received. For example, in order to change the NFC link to a Bluetooth link, Bluetooth pairing may be carried out between the first electronic device and the second electronic device. By doing so, the first electronic device and the second electronic device may switch the NFC link to the Bluetooth link, thereby continuing to perform communication based on a Bluetooth protocol.

As the link between the first electronic device 100 and the second electronic device 200 hands over from NFC to Bluetooth, the first electronic device 100 and the second electronic device 200 may continue data communication even when not positioned within the NFC communication range shown in FIG. 2 and may exchange data at a higher transmit speed than that of the NFC link.

In other words, in case the first electronic device 100 is a smartphone, a user may form an NFC link by bringing his smartphone close to the second electronic device 200, tagging it with the second electronic device 200 and may perform a handover protocol to thereby change the link means to Bluetooth. After the link means is changed, the user may maintain data communication through Bluetooth between the smartphone and the second electronic device 200 even when bringing the smartphone out of the NFC communication range.

The handover process described above in connection with steps S110 to S130 is referred to as negotiated handover. That is, the negotiated handover means that two NFC electronic devices, for example, electronic devices 100 and 200, exchange messages for agreement regarding an alternative carrier used for data exchange. As used herein, the handover may mean negotiated handover.

Hereinafter, other embodiments of the negotiated handover are described.

Figure 3:
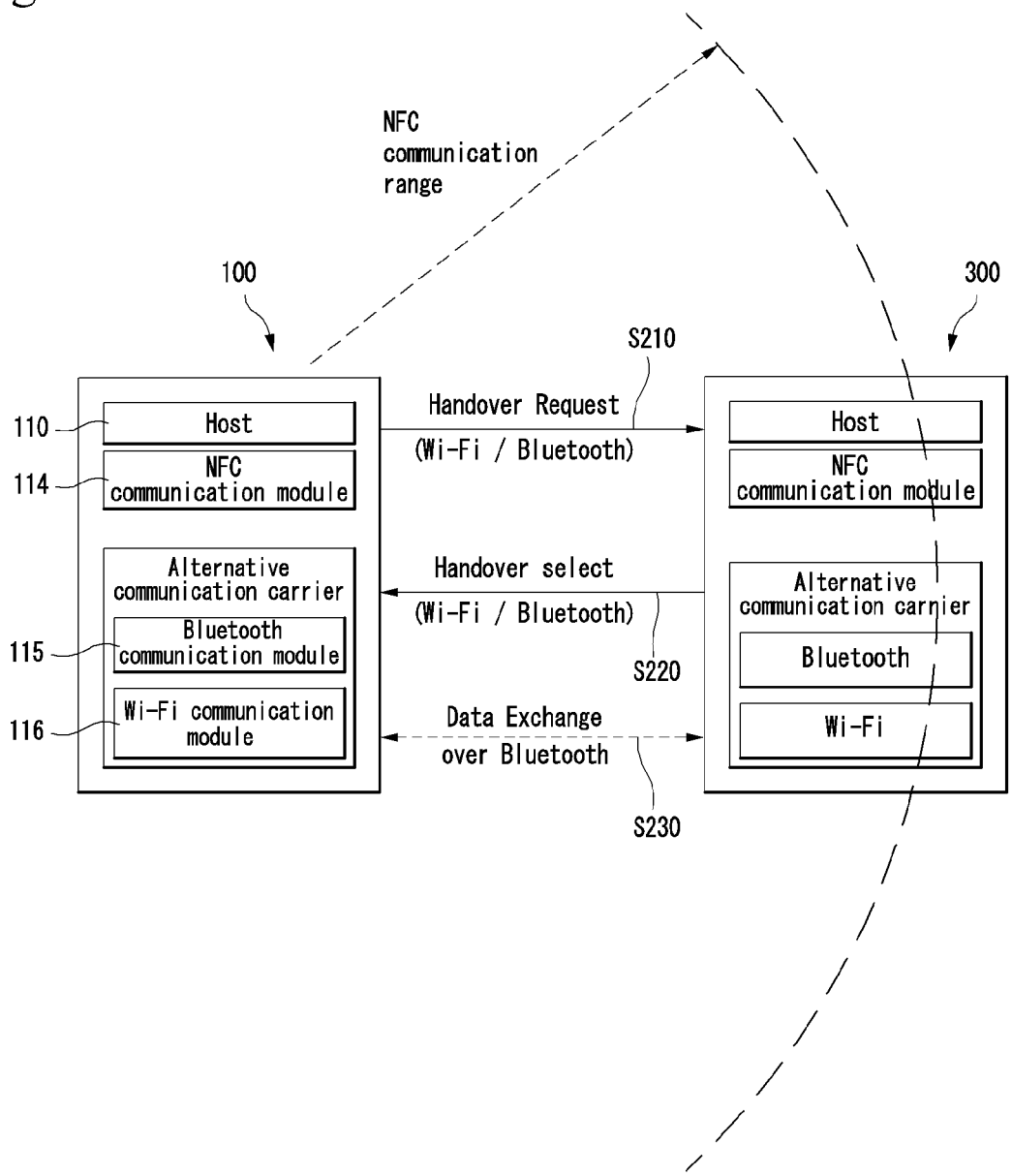
FIG. 3 is a view illustrating handover according to a second embodiment of the present invention.

FIG. 3 is a view illustrating handover according to a second embodiment of the present invention.

In describing handover according to the second embodiment referring to FIG. 3, substantially the same elements as those in the first embodiment are not repeatedly described.

The third electronic device 300 shown in FIG. 3, unlike the second electronic device 200 shown in FIG. 2, may support a plurality of alternative carriers, for example, Bluetooth and Wi-Fi, at the same time.

The first electronic device 100 may send a handover request message to the third electronic device 300 (S210). In other words, the first electronic device 100 is a handover requester, and the third electronic device 300 is a handover selector. Step S210 is the same as step S110 described above in connection with FIG. 2, and detailed description thereof is skipped.

The third electronic device 300 may send a handover selection message to the first electronic device 100 in response to the received handover request message (S220).

The handover selection message transmitted from the third electronic device 300 may contain information on the alternative carriers, Wi-Fi and Bluetooth. Further, the handover selection message may assign a higher priority to Wi-Fi by placing Wi-Fi ahead of Bluetooth as shown in FIG. 3.

The first electronic device 100 may perform communication with the third electronic device 300 via an alternative carrier (S230).

The first electronic device 100 may determine that there are a plurality of alternative carriers as supported by the third electronic device 300, from the handover selection message obtained in step S120.

In case the handover selector, i.e., the third electronic device 300, supports a plurality of alternative carriers, the first electronic device 100 may select one or all of the plurality of alternative carriers. Further, in case the first electronic device 100 selects one alternative carrier, the first electronic device 100 may select the alternative carrier depending on the priorities of the alternative carriers designated by the third electronic device 300 or may select its favored alternative carrier irrespective of the priorities of the alternative carriers designated.

Referring to FIG. 3, the first electronic device 100 may select Bluetooth as an alternative carrier regardless of the alternative carrier priorities assigned by the third electronic device 300, a handover selector.

Figure 4:
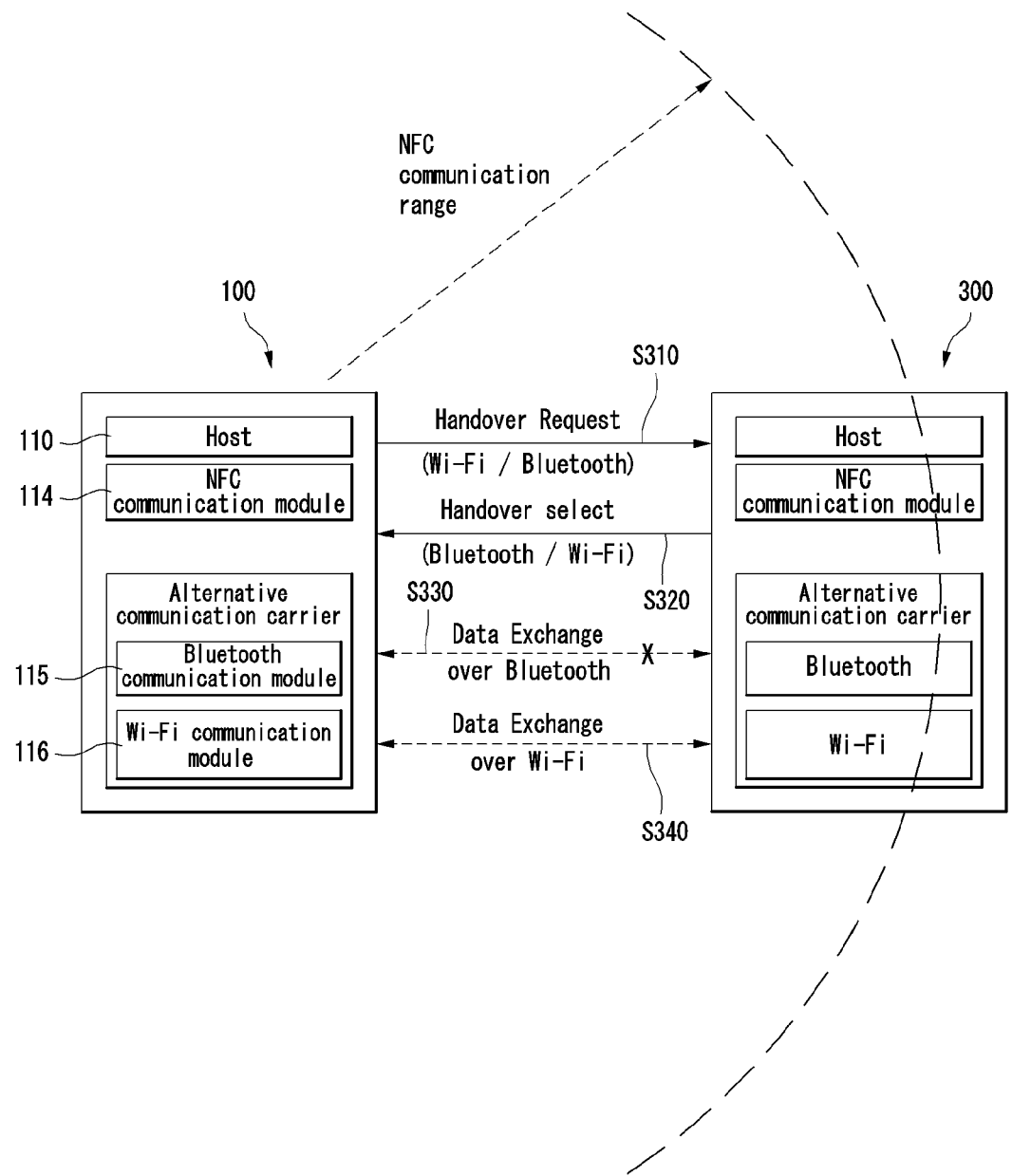
FIG. 4 is a view illustrating handover according to a third embodiment of the present invention.

FIG. 4 is a view illustrating handover according to a third embodiment of the present invention.

Step S310 shown in FIG. 4 is the same as step S210 described above in connection with FIG. 3 and detailed description thereof is skipped.

The third electronic device 300 may send a handover selection message to the first electronic device 100 (S330). At this time, as shown in FIG. 4, the handover selection message may assign a higher priority to Wi-Fi among a plurality of alternative carrier, e.g., Wi-Fi and Bluetooth.

In this case, the first electronic device 100 may first attempt to do Bluetooth pairing according to the priorities assigned by the third electronic device 300, a handover selector, among the plurality of alternative carriers (S330).

Bluetooth pairing may fail due to various causes. For example, in case the first electronic device 100 and the third electronic device 300 are positioned outside a Bluetooth signal range upon performing a handover protocol, Bluetooth pairing may experience failure.

Meanwhile, in case the first electronic device 100 and the third electronic device 300 are positioned within a Bluetooth signal range while a handover protocol is performed, so that handover to Bluetooth is done, and during data exchange via the Bluetooth link, at least one of the first electronic device 100 and the third electronic device 300 relocates, ending up both devices being positioned outside the Bluetooth signal range, the Bluetooth link may fail.

At this time, the first electronic device 100 may continue data communication with the third electronic device 300 via Wi-Fi, an alternative carrier having a lower priority (S340).

Figure 5:
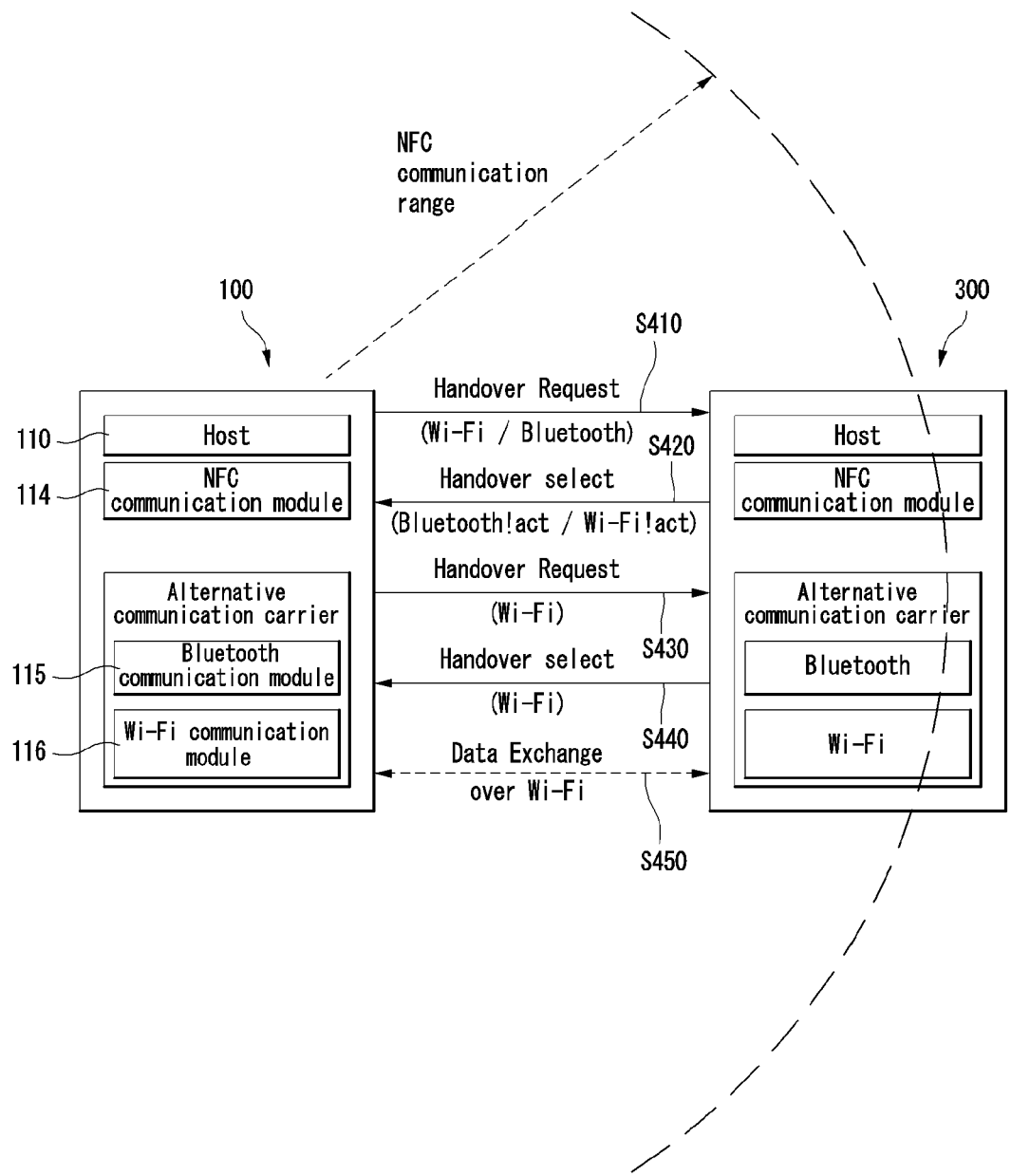
FIG. 5 is a view illustrating handover according to a fourth embodiment of the present invention.

FIG. 5 is a view illustrating handover according to a fourth embodiment of the present invention.

Step S410 shown in FIG. 5 is the same as step S310 described above in connection with FIG. 4, and detailed description thereof is skipped.

The third electronic device 300 shown in FIG. 5 may send a handover selection message to the first electronic device 100 in response to a handover request message received from the first electronic device 100 (S420).

At this time, the handover selection message may contain power state information on an alternative carrier provided by the third electronic device 300.

For example, in case there is an alternative carrier supported by the third electronic device 300 among alternative carriers supported by the first electronic device 100, the third electronic device 300 may send information on a power state of each of the alternative carriers supported by the third electronic device 300, e.g., information on activation or deactivation, to the first electronic device 100.

For example, as shown in FIG. 5, the handover selection message may contain information indicating that Bluetooth and Wi-Fi, alternative carriers of the first electronic device 100, remain deactivated.

In case the received handover selection message contains information on a plurality of alternative carriers, the first electronic device 100 may select any alternative carrier as described earlier. In this embodiment, the first electronic device 100 is assumed to select Wi-Fi as an alternative carrier.

The first electronic device 100 resends a handover request message to the third electronic device 300 (S430). At this time, the transmitted handover request message may designate one of the received multiple alternative carriers. That is, the first electronic device 100 may designate Wi-Fi as alternative carrier in step S430 and may enable the Wi-Fi module of the third electronic device 300 to be activated by sending, to the third electronic device 300, a handover request message designating only Wi-Fi as alternative carrier.

The third electronic device 300 may activate power of the Wi-Fi module in response to the handover request message received in step S430 and send a message responding to the handover request message received in step S430 to the first electronic device 100 (S440).

The first electronic device 100 may perform data exchange with the third electronic device 300 through Wi-Fi (S450).

In other words, when the Wi-Fi module of the third electronic device 300 is activated, the first electronic device 100 may form a Wi-Fi link with the third electronic device 300. That is, the first electronic device 100 may hand the NFC link with the third electronic device 300 over to the Wi-Fi link.

In accordance with the embodiment described above in connection with FIG. 5, the third electronic device 300, a handover selector, may save power by leaving the power of the alternative carrier deactivated until a specific carrier is selected from among a plurality of alternative carriers.

Handover processes according to various embodiments of the present invention have been described thus far. Hereinafter, a handover request collision that may occur during handover and its resolution will be described in detail.

Figure 6:
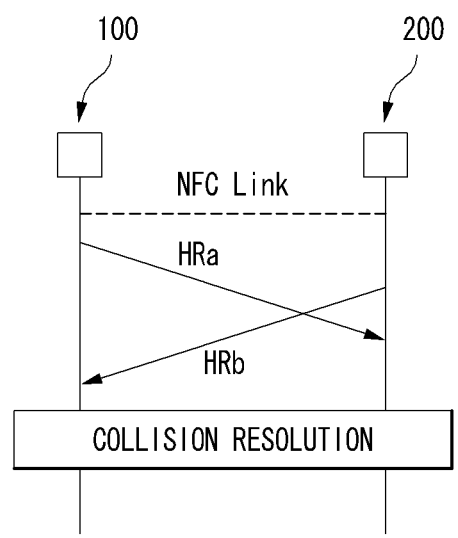
FIG. 6 is a view illustrating a handover collision according to an embodiment of the present invention.

FIG. 6 is a view illustrating a handover collision according to an embodiment of the present invention.

As used herein, the handover request collision refers to the case where after an NFC link is formed between the first electronic device 100 and the second electronic device 200, the first electronic device 100 sends a handover request message to the second electronic device 200, and the second electronic device 200 sends a handover request message to the first electronic device 100—in other words, the case where both electronic devices desire to handover requesters. That is, in the embodiment described above in connection with FIGS. 2 to 5, an electronic device serves as a handover requester while its opposite electronic device serves as a handover selector. In the handover request collision situation, however, the electronic devices both function as handover requesters.

More specifically, referring to FIG. 6, while an NFC link is formed between the first electronic device 100 and the second electronic device 200, the first electronic device 100 sends a first handover request message (HRa) to the second electronic device 200 (S510).

Further, the second electronic device 200 also sends a second handover request message (HRb) to the first electronic device 100 (S520).

Based on what is set forth above in connection with FIGS. 2 to 5, the second electronic device 200 that has received the first handover request message (HRa) is supposed to send a handover selection message to the first electronic device 100 in response to the first handover request message (HRa). However, since the second electronic device 200 sends the second handover request message (HRb) to the first electronic device 100, a handover request collision where the first electronic device 100 and the second electronic device 200 both serve as handover requesters takes place.

In this case, either the first electronic device 100 or the second electronic device 200 should be a handover selector. At this time, determining which one of the first and second electronic devices 100 and 200 is to be a handover selector is referred to as a handover collision resolution.

The first electronic device 100 and the second electronic device 200 perform a handover collision resolution process (S530). The handover collision resolution process is hereinafter described in greater detail.

Meanwhile, in case an electronic device desiring to send a handover request message receives a handover request message from another electronic device prior to sending a handover request message, the first electronic device 100 functions as a handover selector that processes a handover request message received from the other electronic device rather than sending a handover request message to the other electronic device, thereby achieving the handover process.

A handover collision resolution method performed by the first electronic device 100 and the second electronic device 200 in step S530 is now described in detail. The handover collision resolution method may be implemented by various methods. Hereinafter, detailed description is given with reference to the drawings.

Figure 7:
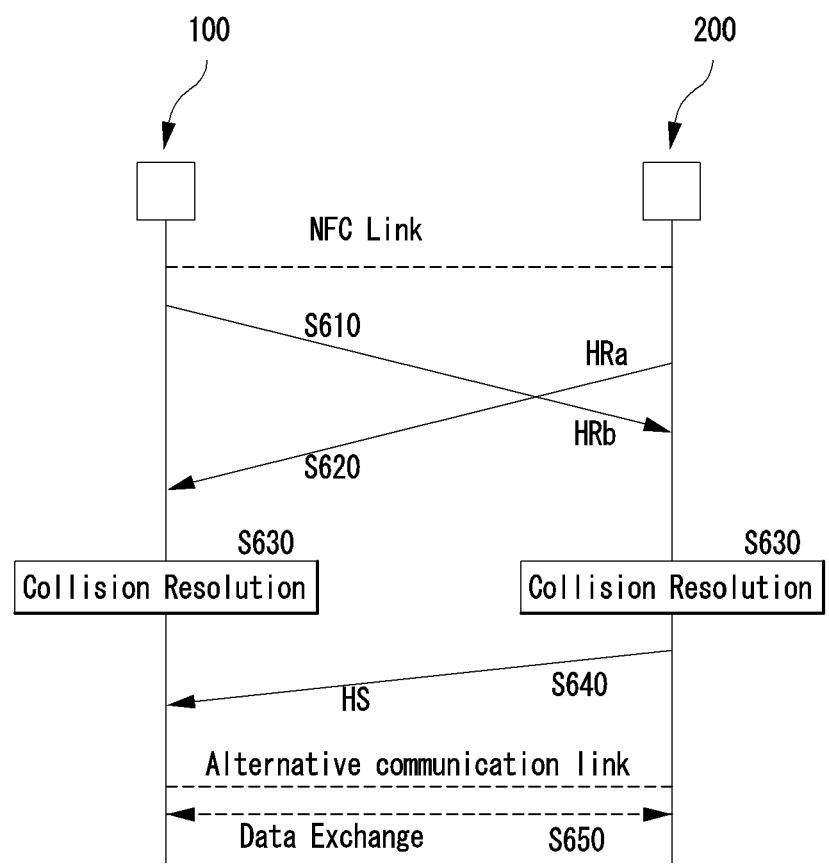
FIG. 7 is a view illustrating a handover collision resolution method according to a first embodiment of the present invention.

FIG. 7 is a view illustrating a handover collision resolution method according to a first embodiment of the present invention. In steps S610 and S620 shown in FIG. 7, the same elements as those in steps S510 and S520 described above in connection with FIG. 6 are not repeatedly described. Further, for convenience, a handover request collision between the first electronic device 100 and the second electronic device 200 is assumed, and this is merely for the purpose of description. Accordingly, the technical scope of the present invention is not limited thereto.

The first electronic device 100 and the second electronic device 200 perform a collision resolution step (S630). That is, the electronic devices 100 and 200 each may perform a handover request collision resolution process. Hereinafter, for convenience of description, a process for resolving a handover request collision in view of the first electronic device 100 is described, but the handover request collision resolution process may also be performed by the second electronic device 200 in the same way.

The first electronic device 100 may compare a specific field contained in the transmitted first handover request message (HRa) with a specific field value contained in the received second handover request message (HRb).

For example, the specific field values may include random numbers.

More specifically, upon sending the first handover request message (HRa) to the second electronic device 200 in step S610, the first electronic device 100 may generate the random number, include the generated random number in the specific field of the first handover request message (HRa), and send it to the second electronic device 200.

Further, the second electronic device 200 may also generate a random number when sending the second handover request message (HRb) to the first electronic device 100, include the generated random number in a specific field of the second handover request message (HRb), and send it to the first electronic device 100.

By doing so, the first electronic device 100 and the second electronic device 200 each may obtain the random numbers contained in the handover request message transmitted to its counterpart and the handover request message received from its counterpart and may compare the random numbers.

The first electronic device 100 may determine whether the first electronic device 100 functions as a handover requester or handover selector by comparing the random number included in the first handover request message (HRa) transmitted to the second electronic device 200 with the random number included in the second handover request message (HRb) received from the second electronic device 200.

Meanwhile, the first electronic device 100 may perform the following steps depending on whether the random numbers are the same or differ from each other according to a result of the comparison.

For example, in case the random numbers are the same, the first electronic device 100 may resend a handover request message to the second electronic device 200. At this time, the first electronic device 100 may re-generate a random number and send the handover request message to the second electronic device 200, with the re-generated random number included in a specific field of the handover request message.

Meanwhile, in case the random numbers are different from each other, the first electronic device 100 may determine that the electronic device that has sent a handover request message with a higher priority functions as a handover requester.

More specifically, the first electronic device 100, in order to determine the priority, may consider one or more bit values included in the received second handover request message (HRb) and transmitted first handover request message (HRa). For example, the one or more bit values may be bit values located at the same position in the random number.

That is, the first electronic device 100 may compare a specific bit value of a random number with a specific bit value of the received random number, and depending on the comparison result, may determine whether it functions as a handover requester or handover selector.

For example, the first electronic device 100 may determine whether the specific bit value transmitted by the first electronic device 100 is the same or differs from the specific bit value received from the second electronic device 200, and based on the determination and size of the transmitted random number and received random number, may determine whether it is to play a role as a handover selector.

More specifically, for example, when the specific bit values are the same, the first electronic device 100 may function as a handover selector in case the first electronic device 100 has generated a larger random number than that generated by the second electronic device 200. In this case, since the second electronic device 200 has generated a smaller random number than that generated by the first electronic device 100 and the specific bit values are the same, the second electronic device 200 may function as handover requester.

Meanwhile, the first electronic device 100, in case the specific bit values are different from each other, may function as handover requester if the first electronic device 100 has generated a larger random number than that generated by the second electronic device 200. In such case, the second electronic device 200 may serve as a handover selector since the specific bit values differ from each other, and the second electronic device 200 has generated a smaller random number than that generated by the first electronic device 100.

That is, whether an electronic device is a handover requester or handover selector is determined considering a result of comparison between specific bit values together with whether one of the random numbers is larger or smaller than the other, thus preventing a device generating a larger/smaller random number from always becoming a handover selector.

Hereinafter, it is assumed that in accordance with the collision resolution method, the first electronic device 100 functions as handover requester while the second electronic device 200 functions as handover selector.

In response to the first handover request message (HRa) received in step S610, the second electronic device 200 may send a handover selection message to the first electronic device 100 (S640).

Meanwhile, the first electronic device 100 has been selected to function as a handover requester in accordance with the collision resolution method, and thus, the first electronic device 100 does not respond to the second handover request message (HRb) received from the second electronic device 200 in step S620.

The first electronic device 100 may complete the handover process according to the handover selection message received from the second electronic device 200 in step S640 (S650). In other words, the first electronic device 100 may complete the handover process by performing the same process as the handover process described above in connection with FIGS. 2 to 5. Accordingly, the first electronic device 100 and the second electronic device 200 may exchange data via an alternative communication means.

Thus, a collision that may occur during the course of a handover process may be effectively resolved according to the embodiment described above in connection with FIGS. 6 and 7.

Hereinafter, a data architecture according to an embodiment of the present invention is described in detail with reference to the accompanying drawings. The data architecture to be described below is merely an example, and the technical scope of the present invention is not limited to a specific data architecture.

Figure 8:
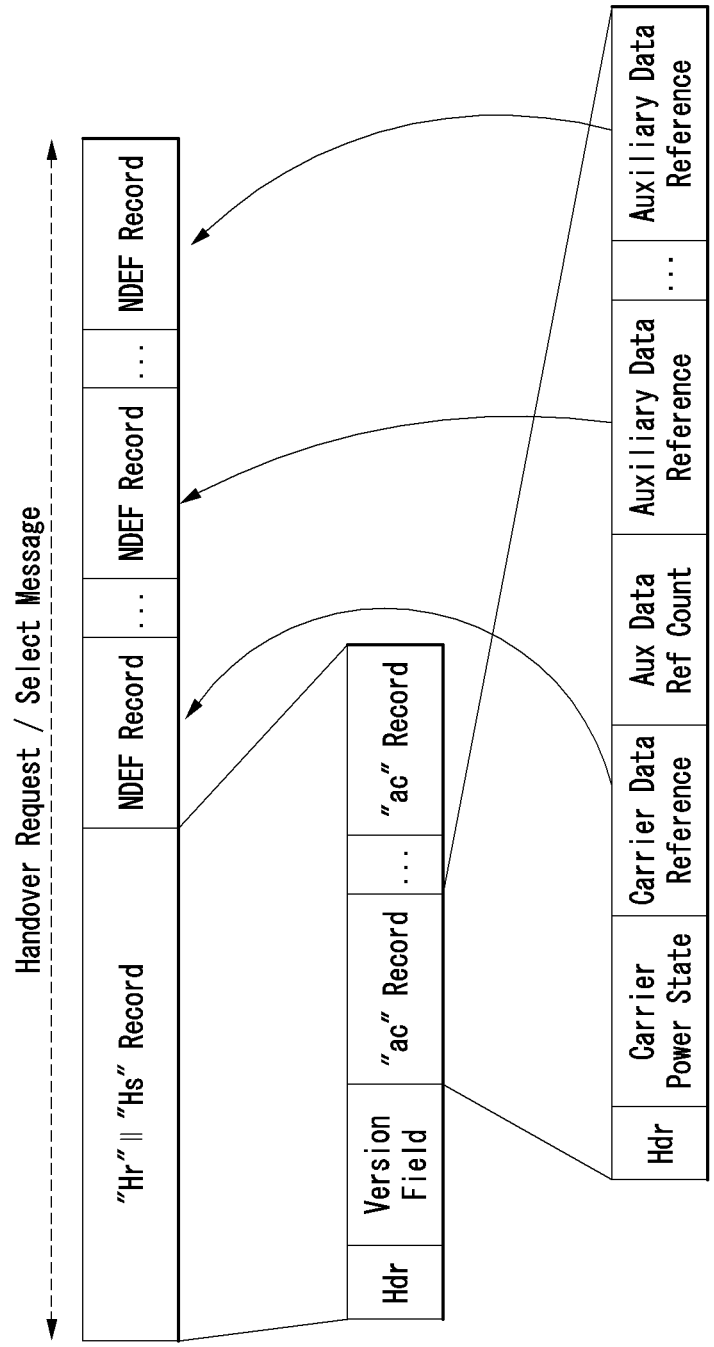
FIG. 8 illustrates the structure of a handover message according to an embodiment of the present invention.

FIG. 8 illustrates the architecture of a handover message according to an embodiment of the present invention. As shown in FIGS. 2 to 7, messages used for a handover process may comprise a handover request message and a handover selection message.

Referring to the upper side of FIG. 8, a handover request message according to an embodiment of the present invention may include a handover request record (hereinafter, "Hr record") and one or more NDEFs (NFC Data Exchange Formats). Further, the handover selection message (hereinafter, "Hs record") may include a handover selection record and one or more NDEF records. The NDEF record may contain specific information on an alternative carrier.

More specifically, the information contained in the NDEF record of the handover request message may include various types as follows.

For example, the information contained in the NDEF record may include information for identifying an alternative communication link. That is, the handover carrier record may offer to the handover selector information on what alternative communication means is supported by the handover requester. As used herein, the NDEF record containing the information for identifying an alternative communication link is referred to as a handover carrier record.

Meanwhile, the information contained in the NDEF record may include environment settings information for forming an alternative communication link. As used herein, the NDEF record including the environment settings information necessary for forming an alternative communication link, for example, a passcode or address necessary for forming a link, is referred to as a carrier environment settings record.

At this time, the carrier environment settings record may further contain information for identifying what the alternative communication means is.

A specific description of the handover carrier record and the carrier environment settings record will be given below.

Referring to a middle part of FIG. 8, the handover request/selection record according to an embodiment of the present invention may contain a header (Hdr), a version field, and at least one of one or more alternative carrier records (hereinafter, ac record), and the alternative carrier record may define an alternative carrier requested/selected by the handover request/selection message. Further, the handover request/selection record may contain more or fewer information fields.

Referring to a lower part of FIG. 8, the ac record according to an embodiment of the present invention may contain at least one of information fields including a header (Hdr), a carrier power state, a carrier data reference, an auxiliary data reference count, and one or more auxiliary data references.

The carrier data reference and the auxiliary data reference may reference a corresponding NDEF record shown in the upper part of FIG. 8.

Hereinafter, each information piece mentioned above in connection with FIG. 8 is described below in greater detail.

Figure 9:
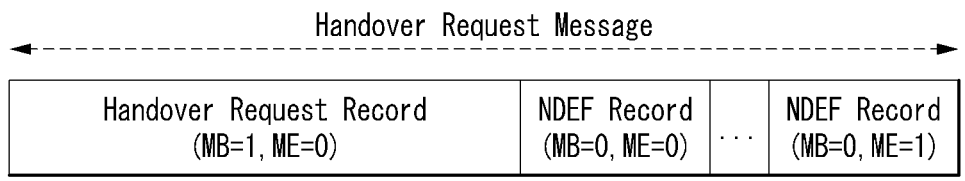
FIG. 9 illustrates an example handover request message according to an embodiment of the present invention.

FIG. 9 illustrates an example of a handover request message according to an embodiment of the present invention.

The handover request message may be used for the handover requester to provide information on an alternative carrier supported by the handover requester to the handover selector as described above in connection with FIGS. 2 to 7.

The handover request message may contain a handover request record and one or more NDEF records. For example, the handover request message may start with a handover request record and end with an NDEF record.

More specifically, the handover request message may start with a handover request record including a flag set as a message beginning (MB) and may end with an NDEF record having a flag set as a message end (ME).

The handover request message should contain at least one alternative carrier, and thus, cannot have a record having the MB and ME flags both set.

The NDEF record may be a handover carrier record or a carrier environment settings record depending on characteristics of an alternative carrier. Further, the NDEF record may be constituted of auxiliary data. A specific description of the NDEF record will be given below.

Figure 10:
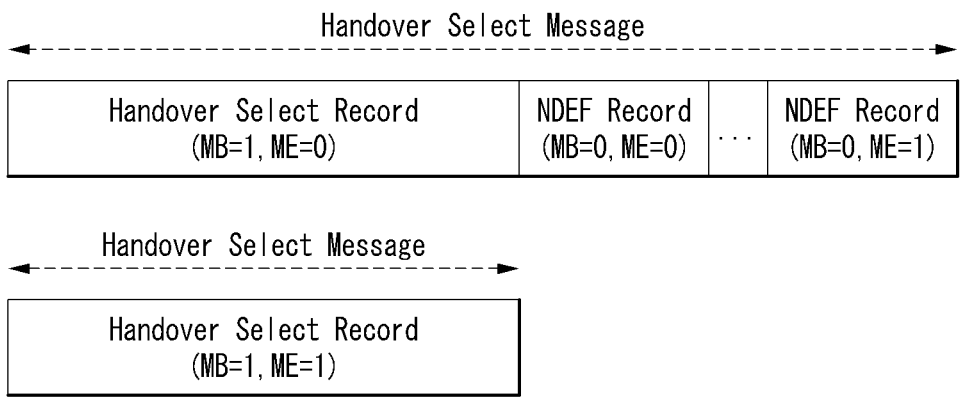
FIG. 10 illustrates an example handover selection message according to an embodiment of the present invention.

FIG. 10 illustrates an example of a handover selection message according to an embodiment of the present invention.

The handover selection message, as described above in connection with FIGS. 2 to 7, may be used for the handover selector to provide to the handover requester information on an alternative carrier supported by the handover selector among alternative carriers contained in the handover request message received from the handover requester.

Referring to an upper part of FIG. 10, the structure of the handover selection message may be the same as the handover request message described above in connection with FIG. 9.

Further, referring to a lower part of FIG. 10, the handover selection message may contain a single record having a message beginning (MB) and a message end (ME) both set. That is, in such case, none of the alternative carriers supported by the handover requester are supported by the handover selector.

Hereinafter, the handover request records shown in FIGS. 8 and 9 are described in greater detail.

Figure 11:
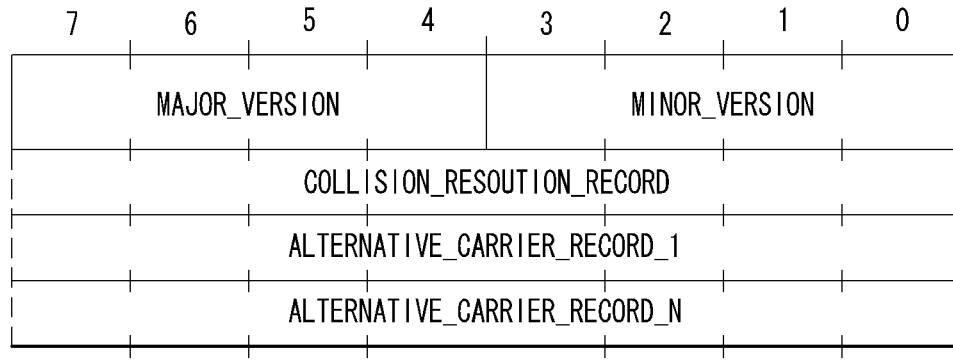
FIG. 11 illustrates an example handover request record according to an embodiment of the present invention.

FIG. 11 illustrates an example of a handover request record according to an embodiment of the present invention.

The handover request record may contain a list of alternative carriers that may be used by the handover requester to communicate with the handover selector. The handover request record may indicate at least one or more alternative records.

Referring to FIG. 11, the handover request record may include information on at least one of a major version, a minor version, a collision resolution record, and alternative carrier records 1 to n.

The collision resolution record may contain a random number to resolve a handover request collision described above in connection with FIG. 7.

Each of the alternative carrier records may specify an alternative carrier supported by the handover requester in order for communication between the handover selector and the handover requester. Information on the alternative carrier specified by each alternative carrier record may be contained in the NDEF record of the handover request message.

Hereinafter, the handover selection record shown in FIGS. 8 and 10 is described below in detail.

Figure 12:
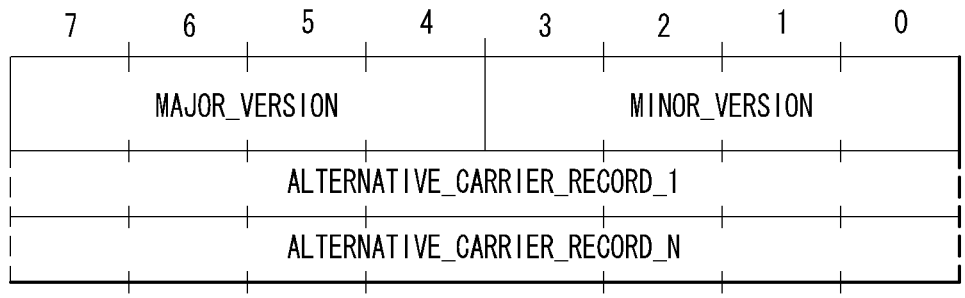
FIG. 12 illustrates an example handover selection record according to an embodiment of the present invention.

FIG. 12 illustrates an example of a handover selection record according to an embodiment of the present invention.

The handover selection record may contain information on an alternative carrier supported by the handover selector among alternative carriers included in the handover request message received by the handover selector from the handover requester.

As shown in FIG. 12, the handover selection record may include information on at least one of a major version, a minor version, and alternative carrier records 1 to n.

The alternative carrier record included in the handover selection record may contain information on an alternative carrier simultaneously supported by the handover requester and the handover selector.

Further, the order in which the alternative carriers are included in the handover selection record may indicate the priority of the alternative carriers favored by the handover selector. For example, the alternative carrier indicated with alternative carrier record 1 may have a higher priority than the alternative carrier indicated with alternative carrier record n. This may apply to the embodiment described above in connection with FIGS. 3 to 5.

Hereinafter, a handover carrier record, an example of the NDEF record shown in FIGS. 8 and 9, is described in detail.

Figure 13:
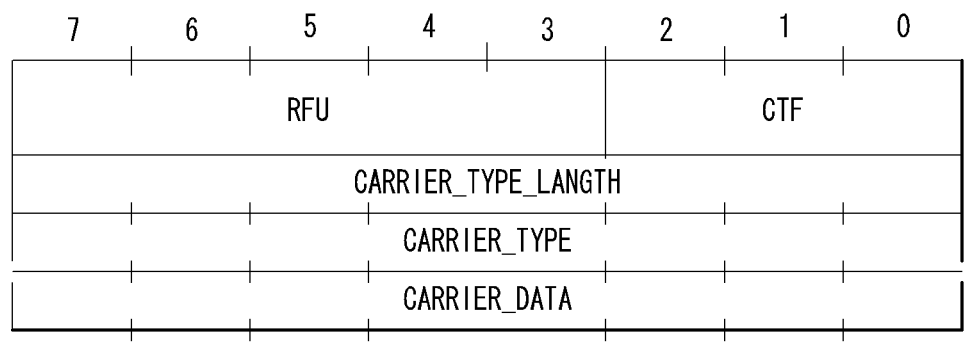
FIG. 13 illustrates an example handover carrier record according to an embodiment of the present invention.

FIG. 13 illustrates an example of a handover carrier record according to an embodiment of the present invention.

The handover carrier record may contain information for identifying an alternative carrier.

Referring to FIG. 13, the handover carrier record may include at least one of, e.g., a carrier type format (hereinafter, "CTF"), a carrier type length, a carrier type, and carrier data.

The carrier type format may function to indicate the structure of the value written in the carrier type that is to be described below.

For example, the carrier type format may correspond to at least one of an NFC forum well-known type, a media type specified in RFC 2046, an absolute URI specified in RFC 3986, and an NFC external type.

The carrier type length may refer to the length of a carrier type to be described below.

The carrier type may provide a unique identifier of an alternative carrier. The carrier type should follow a structure, encoding, and format according to the carrier type format.

Based on at least one of the carrier type format, carrier type length, and the carrier type, more specifically, the carrier type, the handover selector may identify an alternative carrier supported by the handover requester.

The carrier data may contain additional information on the alternative carrier.

Meanwhile, the handover carrier record may be contained in the handover request message as an NDEF record of the handover request message. When receiving the handover carrier record, the handover selector may send to the handover requester a handover selection message including environment settings information on the alternative carrier identified by the handover carrier record, for example, the carrier environment settings record. When receiving the carrier environment settings record, the handover requester may perform handover according to the environment settings information included in the carrier environment settings record.

Hereinafter, the alternative carrier record (ac Record) shown in FIGS. 8 and 12 is described in detail.

Figure 14:
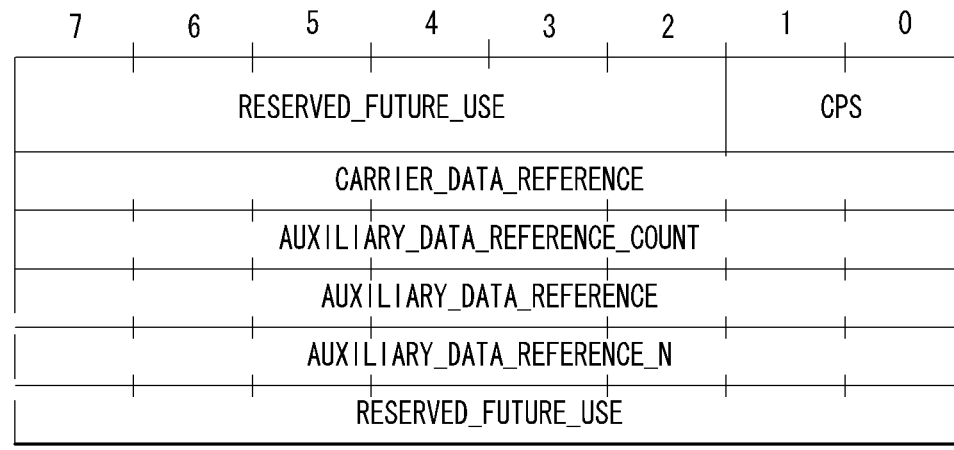
FIG. 14 illustrates an example alternative carrier record according to an embodiment of the present invention.

FIG. 14 illustrates an example of an alternative carrier record according to an embodiment of the present invention.

The alternative carrier record may be included in the handover request record or the handover selection record.

As shown in FIG. 14, the alternative carrier record may contain at least one of a carrier power state (CARRIER POWER STATE, i.e., CPS), a carrier data reference (CARRIER_DATA_REFERENCE), an auxiliary data reference count (AUXILIARY_DATA_REFERENCE_COUNT), and auxiliary references 1 to N (AUXILIARY_DATA_REFERENCE 1 TO N).

The carrier power state indicates a power state of the alternative carrier. The carrier power state may be at least one of, e.g., deactivated, activated, being activated, and unknown. The carrier power state may apply to step S420 described above in connection with FIG. 5.

The carrier data reference may function to indicate the NDEF record shown in the upper part of FIG. 8. As set forth earlier, the NDEF record may be a handover carrier record or a carrier environment settings record.

The auxiliary data reference count may mean the number of subsequent auxiliary data references.

The auxiliary data reference may indicate an NDEF record providing additional information on the alternative carrier.

A method of transmitting and receiving a message between two electronic devices upon handover, a process of shifting a link to an alternative carrier as the message is transmitted and received, and a message structure have been described thus far. Hereinafter, specific operations of various electronic devices associated with handover are described. The specific operations of the electronic devices may be implemented, for example, by the first electronic device 100 described above.

First, prior to describing a specific operation of the first electronic device 100, the configuration of the first electronic device 100 is briefly described.

Figure 15:
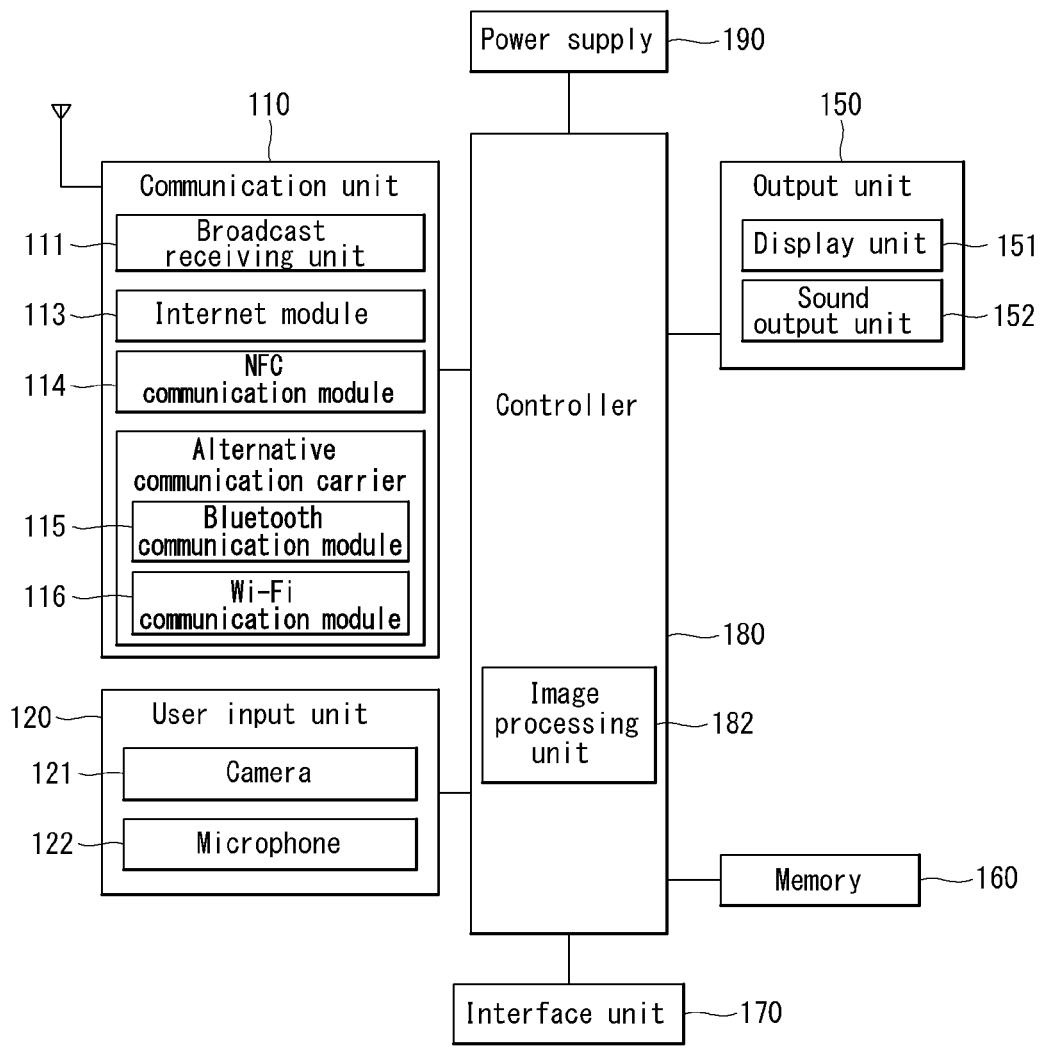
FIG. 15 is a block diagram illustrating an electronic device according to an embodiment of the present invention.

FIG. 15 is a block diagram illustrating an electronic device according to an embodiment of the present invention.

As shown in FIG. 15, the first electronic device 100 according to an embodiment of the present invention may include a communication unit 110, a user input unit 120, an output unit 150, a memory 160, an interface unit 170, a controller 180, and a power supply 190. The components shown in FIG. 15 may be the ones that may be commonly included in a display apparatus. Accordingly, a display apparatus including more or less components than those shown in FIG. 15 may be implemented.

The communication unit 110 may include one or more modules that enable communication between the first electronic device 100 and a communication system or between the first electronic device 100 and another device. For example, the communication unit 110 may include a broadcast receiving unit 111, an Internet module unit 113, an NFC communication module 114, a Bluetooth communication module 115, and a Wi-Fi communication module 116.

The broadcast receiving unit 111 receives a broadcast signal and/or broadcast-related information from an external broadcast managing server via a broadcast channel.

The broadcast channel may include a satellite channel or a terrestrial channel. The broadcast managing server may mean a server that generates and sends out a broadcast signal and/or broadcast-related information or a server that receives a pre-generated broadcast signal and/or broadcast-related information and transmits it to a terminal. The broadcast signal may include not only a TV broadcast signal, a radio broadcast signal, a data broadcast signal, but also a mixed signal of a TV broadcast signal or radio broadcast signal and a data broadcast signal.

The broadcast-related information may mean information associated with a broadcast channel, a broadcast program or a broadcast service provider. The broadcast-related information may also be provided through a communication network.

The broadcast-related information may exist in various forms. For example, the broadcast-related information may be offered in the form of an EPG (Electronic Program Guide) of DMB (Digital Multimedia Broadcasting) or an ESG (Electronic Service Guide) of a DVB-H (Digital Video Broadcast-Handheld).

The broadcast receiving unit 111 may receive a broadcast signal using various broadcast systems.

A broadcast signal and/or broadcast-related information received via the broadcast receiving unit 111 may be stored in the memory 160.

The Internet module unit 113 may mean a module for Internet access. The Internet module unit 113 may be embedded or positioned outside the first electronic device 100.

The NFC communication module 114 refers to a module for communicating with other electronic device through NFC (Near Field Communication) technology.

The Bluetooth communication module 115 refers to a module for communicating with other electronic device using a Bluetooth technique.

The Wi-Fi communication module 116 refers to a module for communicating with other electronic device using Wi-Fi technique.

Although FIG. 15 shows only the NFC communication module 114, the Bluetooth communication module 115, and the Wi-Fi communication module 116, more communication modules for other near-field communication methods may be provided. The near-field communication technique may use RFID (Radio Frequency Identification), infrared data association (IrDA), UWB (Ultra Wideband), ZigBee, WiGig, and WiHD.

The user input unit 120 is for entering an audio signal or video signal and may include a camera 121 and a microphone unit 122.

The camera 121 processes an image frame such as a still image or video obtained by an image sensor in video call mode or image capturing mode. The processed image frame may be displayed on a display unit 151. The camera 121 may capture a 2D or 3D image and may be a 2D or 3D camera alone or a combination of the 2D and 3D camera.

The image frame processed by the camera 121 may be stored in the memory 160 or may be sent out through the communication unit 110. Two or more cameras 121 may be provided depending on the configuration of the first electronic device 100.

The microphone unit 122 receives an external sound signal through a microphone in call mode, recording mode, or voice recognition mode and turns it into electrical voice data. The microphone unit 122 may have various noise cancelling algorithms to remove noise that is generated while the external sound signal is received. Further, a user may input various voice commands for driving the first electronic device 100 to execute functions through the microphone unit 122.

The output unit 150 may include a display unit 151 and a sound output unit 152.

The display unit 151 displays information processed by the first electronic device 100. For example, the display unit 151 displays a UI (user interface) or GUI (graphic user interface) associated with the first electronic device 100. The display unit 151 may be at least one of a liquid crystal display, a thin film transistor-liquid crystal display, an organic light-emitting diode display, a flexible display, and a 3D display. Further, the display unit 151 may be configured in a transparent type or light-transmissive type, and in such case, the display unit 151 may be called a transparent display a representative example of which is a transparent LCD. The rear part of the display unit 151 may have a light-transmissive structure. Such structure may enable a user to view an object that is positioned at the rear side of a terminal body through the display unit 151 area of the body.

Depending on the implementation of the first electronic device 100, two or more display units 151 may be provided.

For example, the first electronic device 100 may have a plurality of display units 151 spaced apart from each other or integrally provided on its surface or on its different surfaces, respectively. In case the display unit 151 is structured to be layered with a sensor sensing a touch (hereinafter, a "touch sensor")—hereinafter, simply referred to as a "touch screen," the display unit 151 may also be used as an input device, as well as an output device. The touch sensor may have a form of a touch film, a touch sheet, or a touchpad.

The touch sensor may be configured to turn a change in, e.g., capacitance, which occurs at a specific area of the display unit 151 or a change in the pressure on a specific area, into an electrical input signal. The touch sensor may be configured to detect the pressure of a touch, as well as the position and area of the touch.

In case a touch sensor is touched, a signal corresponding thereto is sent to a touch controller. The touch controller processes the signal and sends corresponding data to the controller 180. Accordingly, the controller 180 may be aware of, e.g., which area on the 151 has been touched.

The sound output unit 152 may output audio data received from the communication unit 110 or stored in the memory 160. The sound output unit 152 may output a sound signal associated with a function performed in the first electronic device 100 (for example, a call reception sound, message reception sound, etc.). The sound output unit 152 may include a receiver, a speaker, and a buzzer.

The memory 160 may store a program for operation of the controller 180 and temporarily store input/output data (for example, a phone book, a message, a still image, a video, etc.). The memory 160 may store data associated with various patterns of vibrations and sounds that are output when the touch screen is touched.

The memory 160 may include a storage medium of at least one of a flash memory type, a hard disk type, a multimedia card micro type, a memory card (e.g., SD or XD memory), a RAM (random access memory), an SRAM (static random access memory), a ROM (read-only memory), an EEPROM (electrically erasable programmable read-only memory), a PROM (programmable read-only memory), a magnetic memory, a magnetic disc, and an optical disc.

The first electronic device 100 may operate in association with a Web storage that performs the storing function of the memory 160 over the Internet.

The interface unit 170 serves as a pathway to each external device that is connected with the first electronic device 100. The interface unit 170 receives data or power from the external device and transfers it to each component in the first electronic device 100 or enables data to be transmitted from the inside of the first electronic device 100 to the outside. For example, the interface unit 170 may include a wired/wireless headset port, an external recharger port, a wired/wireless data port, a memory card port, a port connecting to a device having an identifying module, an audio I/O (input/output) port, a video I/O (input/output) port, and an earphone port.

The controller 180 typically controls the overall operation of the display apparatus. For example, the controller 180 conducts control and process regarding voice call, data communication, and video call.

The controller 180 may include an image processing unit 182 for image processing. The image processing unit 182 is described in greater detail at the relevant part.

The power supply 190 receives external and internal power under the control of the controller 180 and supply each component with power necessary for operating the same.

Various embodiments set forth herein may be implemented in a recording medium that may be read by a computer or a similar device using software, hardware, or a combination thereof. When implemented in hardware, the embodiments set forth herein may be realized using at least one of ASICs (application specific integrated circuits), DSPs (digital signal processors), DSPDs (digital signal processing devices), PLDs (programmable logic devices), FPGAs (field programmable gate arrays), processors, controllers, microcontrollers, microprocessors, or other electrical units for performing the functions. In some cases, such embodiments may be implemented by the controller 180.

When implemented in software, embodiments such as procedures or functions may be embodied together with a separate software module that enables at least one function or operation to be conducted.

A software code may be implemented by a software application written in proper programming language. Further, the software code may be stored in the memory 160 and executed by the controller 180.

Subsequently, a method of operating an electronic device according to a fifth embodiment of the present invention is described in detail with reference to FIGS. 16 to 20.

Figure 16:
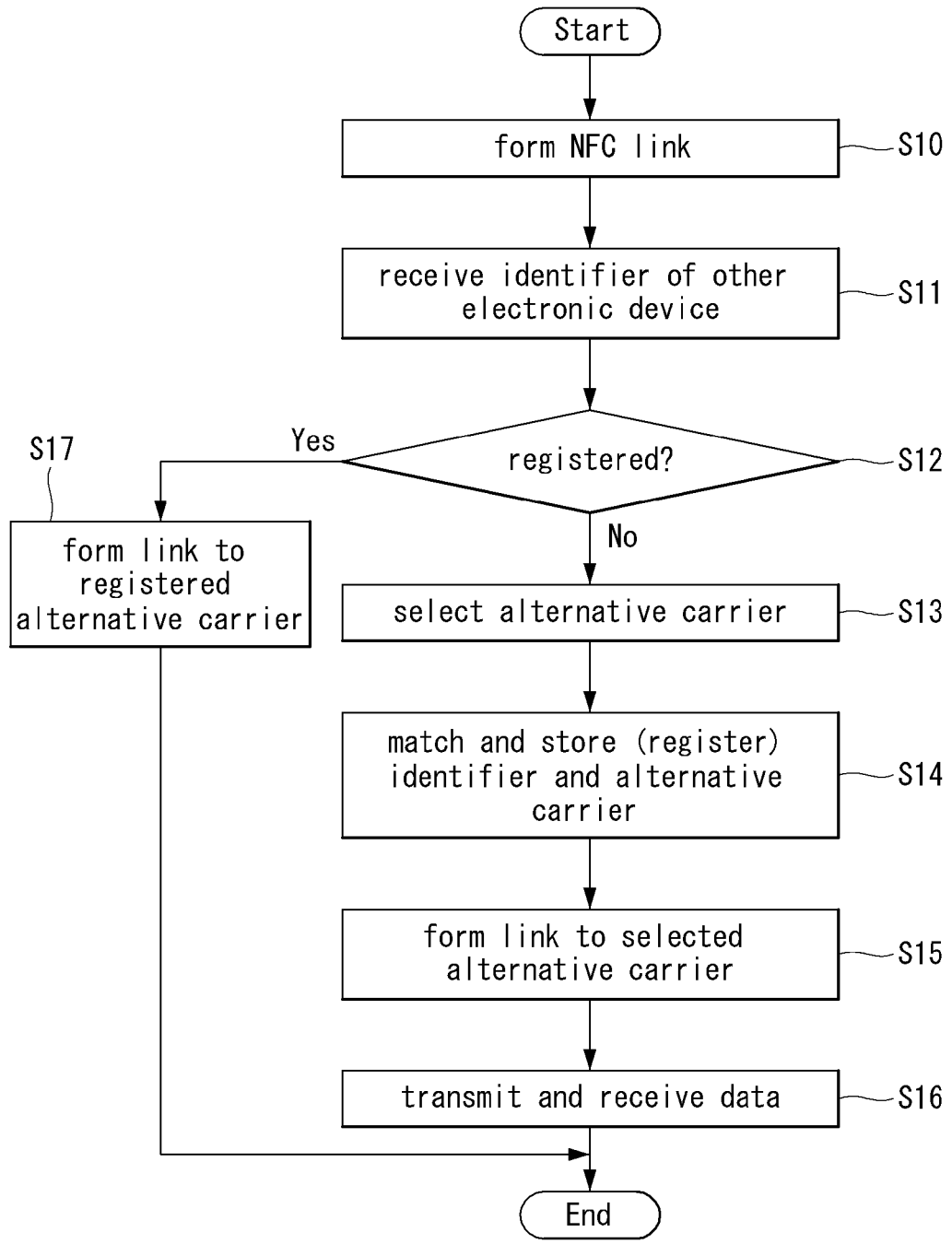
FIG. 16 is a flowchart illustrating a method of operating an electronic device according to a fifth embodiment of the present invention.

FIG. 16 is a flowchart illustrating a method of operating an electronic device according to a fifth embodiment of the present invention. Hereinafter, the "other electronic device" is described, by way of example, as the second electronic device 200 or the third electronic device 300.

Referring to FIG. 16, the method of operating an electronic device according to the fifth embodiment of the present invention may include forming an NFC link between the first electronic device 100 and other electronic device 200 or 300 (S10), receiving an identifier of the other electronic device 200 or 300 connected via the NFC link (S11), and determining whether the connected other electronic device 200 or 300 is a pre-registered electronic device based on the received identifier (S12).

If it is determined in step S12 that the connected other electronic device 200 or 300 is not pre-registered, the first electronic device 100 may conduct at least one of selecting an alternative carrier (S13), storing (registering) the identifier received in step S11, with the identifier matching the selected carrier (S14), or forming a link with the other electronic device via the selected alternative carrier (S15).

If it is determined in step S12 that the connected other electronic device 200 or 300 is a pre-registered electronic device, the first electronic device 100 may conduct verifying the pre-registered and forming a link with the other electronic device 200 or 300 via the registered alternative carrier (S17).

Subsequently, the first electronic device 100 may perform transmitting and receiving data via the link formed in step S15 or S17 (S16).

Hereinafter, each step in the method of operating an electronic device according to the fifth embodiment of the present invention is described in further detail.

The first electronic device 100 may form an NFC link with the other electronic device 200 or 300 (S10).

For example, the NFC communication module 114, as shown in FIG. 1, may form an NFC link through tagging with the NFC communication module of the other electronic device within an NFC communication range, and this has been already described above. Further, the NFC communication module 114 may communicate with the NFC communication module of the other electronic device 200 or 300 in various modes. This has been described above and thus detailed description thereof is skipped.

Meanwhile, a handover operation according to the present invention need not be inevitably performed for all the cases where the first electronic device 100 and the other electronic device 200 or 300 form an NFC link. Thus, the first electronic device 100 may have a separate mode for entering the handover operation activated before or after forming an NFC link with the other electronic device 200 or 300 (S10).

For example, in case a user makes a specific motion with the first electronic device 100 and then tags it to the other electronic device 200 or 300, the first electronic device 100 may identify the specific motion and activate a separate mode for entering the handover operation.

As another example, in case a user requests handover through a menu of the first electronic device 100 and then tags the first electronic device 100 to the other electronic device 200 or 300, the first electronic device 100 may activate a separate mode for entry into the handover operation. Or, such user's request may be made after an NFC link between the first electronic device 100 and the other electronic device 200 or 300 is formed.

The first electronic device 100 may receive an identifier of the other electronic device 200 or 300 connected via the NFC link formed in step S10 through the NFC link (S11). The identifier of the other electronic device 200 or 300 does not need to be a unique code value or serial number assigned to the other electronic device 200 or 300 as long as the first electronic device 100 may identify with the identifier whether the other electronic device connected via the NFC link is the second electronic device 200 or the third electronic device 300. For example, in case the first to third electronic devices 100, 200, and 300 are all possessed by user A assigns nick names "A's smartphone," "A's TV," and "my tablet" to the first to third electronic devices 100, 200, and 300, respectively, the nick names may serve as identifiers.

Subsequently, the first electronic device 100 may determine whether the connected other electronic device 200 or 300 is pre-registered based on the received identifier (S12). A process of registering other electronic device in the first electronic device 100 is described in detail in connection with steps S13 and S14 and detailed description thereof is not given here.

If the other electronic device 200 or 300 is pre-registered, a link may be formed between the first electronic device 100 and the other electronic device 200 or 300 via a registered alternative carrier (S17).

In contrast, unless the other electronic device 200 or 300 is pre-registered, the following process of registering an electronic device may be carried out.

The first electronic device 100 may select an alternative carrier that is to form a link with the other electronic device 200 or 300 via an NFC link (S13).

In selecting the alternative carrier in step S13, the first electronic device 100 may follow one or a combination of the first to fourth embodiments described above. That is, the first electronic device 100 may automatically select an alternative carrier according to a predetermined standard based on the messages exchanged between the first electronic device 100 and the other electronic device 200 or 300.

Or, the first electronic device 100 may select an alternative carrier based on a user's entry. Hereinafter, a method of selecting an alternative carrier based on a user's entry is described in more detail.

Figure 17:
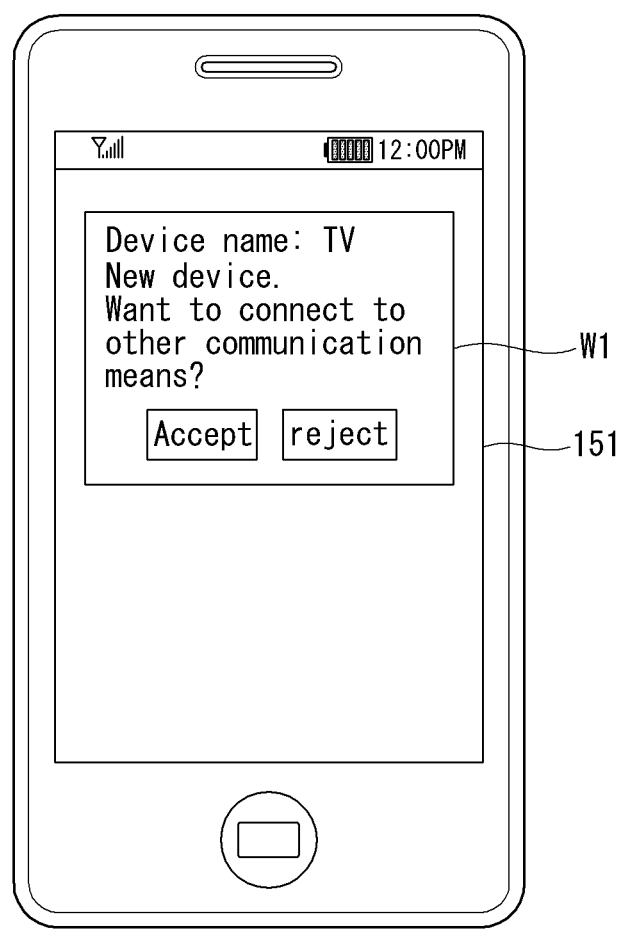
FIGS. 17 to 19 are views illustrating a method of selecting an alternative carrier based on a user's entry according to the fifth embodiment of the reception.
Figure 18:
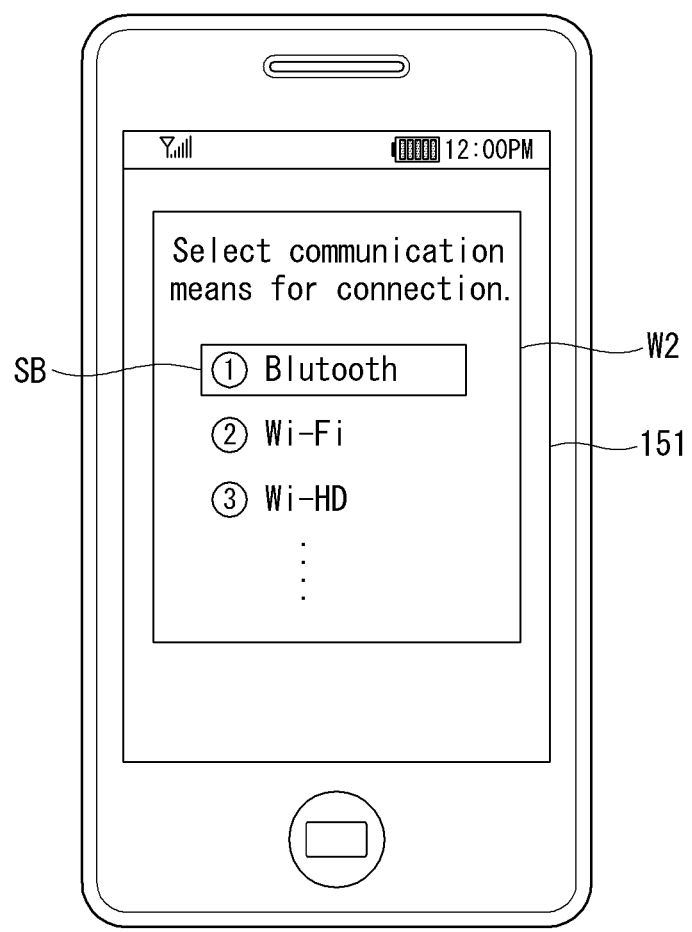
Figure 19:
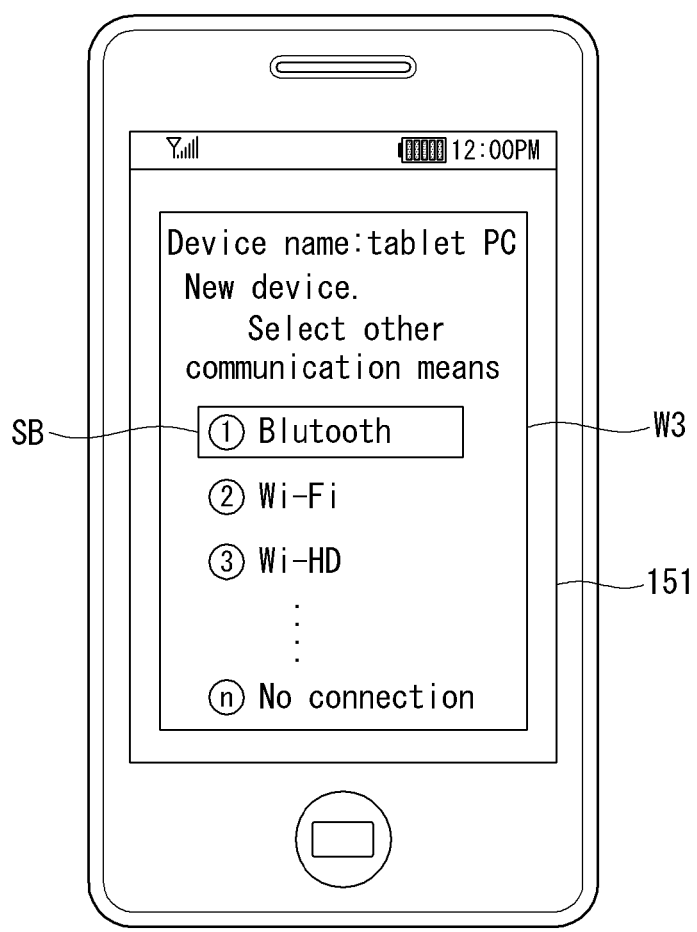

FIGS. 17 to 19 are views illustrating a method of selecting an alternative carrier based on a user's entry according to a fifth embodiment of the present invention.

The first electronic device 100, in case the other electronic device 200 or 300 connected via an NFC link is determined in steps S10 to S12 to be not a pre-registered electronic device, may display a window W1 inquiring a user whether it is to make a connection with the other electronic device 200 or 300 via an alternative carrier through the display unit 151 as shown in FIG. 17. At this time, the first electronic device 100 may also display an identifier of the other electronic device 200 or 300 received in step S11.

Subsequently, in case the user refuses to make a connection via an alternative carrier through the window W1 shown in FIG. 17, the first electronic device 100 does not attempt to form a link with the other electronic device 200 or 300 via an alternative carrier, but although not shown in the drawings, may terminate the process of registering an alternative carrier on the other electronic device 200 or 300.

In contrast, in case the user requests making a connection via an alternative carrier through the window W1 shown in FIG. 17, the first electronic device 100, as shown in FIG. 18, may display types of alternative carriers connectable with the other electronic device 200 or 300, and in case there are multiple alternative carriers, may display one more window W2 for selection of one of the alternative carriers.

At this time, the type of a connectable alternative carrier displayed on the window W2 shown in FIG. 18 may be determined based on the above-described handover request message and handover selection message.

For example, in case the communication unit 110 of the first electronic device 100 may conduct near-field wireless communication through Bluetooth, Wi-Fi, Wi-HD, and Zigbee, as described above in connection with the first to fourth embodiments, all the near-field wireless communication means are to be written in the handover request message sent from the first electronic device 100 to the other electronic device 200 or 300. At this time, in case the other electronic device 200 or 300 may do near-field wireless communication through Bluetooth, Wi-Fi, Wi-HD, and WiGig, as described above, all the near-field wireless communication means are to be written in the handover selection message sent from the other electronic device 200 or 300 to the first electronic device 100. Accordingly, the first electronic device 100 may display the types of alternative carriers supported by both the first electronic device 100 and the other electronic device 200 or 300 on the window W2.

Meanwhile, in case a plurality of alternative carriers are supported by both the first electronic device 100 and the other electronic device 200 or 300, the first electronic device 100 may assign priorities to the alternative carriers and display the alternative carriers according to the assigned priorities.

The first electronic device 100 may assign the priorities depending on the circumstance of the first electronic device 100. For example, the priorities may be assigned depending on the number of times by which the alternative carriers have been used when a wireless communication link is formed between the first electronic device 100 and the other electronic device 200 or 300. That is, in case a wireless communication link between the first electronic device 100 and the other electronic device 200 or 300 has been formed through Wi-Fi twenty times and through Bluetooth ten times, Wi-Fi may be assigned a higher priority. As another example, a higher priority may be assigned to an alternative carrier further associated with an application being executed on the first electronic device 100 according to the application. That is, in case an application in execution on the first electronic device 100 is a contact application assigned with a relatively small capacity of data, Bluetooth that is more appropriate for a small-capacity of data communication may be assigned a higher priority, but in case the application is a video album application associated with a relatively larger capacity of data, a communication carrier such as Wi-Fi or Wi-HD more proper for a higher-capacity of data communication may be assigned a higher priority.

In displaying a plurality of alternative carriers assigned priorities, the first electronic device 100 may display the user interface so that a user's accessibility to an alternative carrier with a higher priority is higher. For example, an alternative carrier with a higher priority may be displayed at a higher position on the list. As another example, an alternative carrier with a higher priority may basically have a selection bar (SB) positioned and displayed thereon. As still another example, the size of an image or text displaying an alternative carrier with a higher priority may be displayed to be larger than the size of an image or text displaying an alternative carrier with a lower priority. As yet still another example, an image or text displaying an alternative carrier with a higher priority may be highlighted.

Accordingly, a user may select an alternative carrier that is to connect the first electronic device 100 with the other electronic device 200 or 300 through the selection bar (SB), and the first electronic device 100 opts for the alternative carrier selected by the user in step S13. Although an example where an alternative carrier is selected by the selection bar (SB) in connection with FIG. 18, selection made by any means that may select an alternative carrier, for example, a touch input, gesture input, or voice input, may belong to the scope of the present invention.

Further, although the first electronic device 100 sends out a handover request message, and the other electronic device 200 or 300 transmits a handover selection message, the other electronic device 200 or 300 may send a handover request message, while the first electronic device 100 may send a handover selection message, and an example thereof has been described above. Accordingly, a detailed description of such an example is skipped. Further, in case a collision occurs between the first electronic device 100 and the other electronic device 200 or 300, the above-described resolution method may apply.

According to the method described above in connection with FIGS. 17 and 18, the handover request message and the handover selection message may be transmitted or received when a user selects the "connection" through the window shown in FIG. 17, but it need not be inevitably done so. In other words, the handover request message and the handover selection message may be transmitted before the first electronic device 100 displays the window W1 shown in FIG. 17 or in the middle of the window W1 being displayed.

However, in case the other electronic device 200 or 300 is pre-registered through step S12, the handover request message and handover selection message for selecting an alternative carrier do not need to be sent. Accordingly, the handover request message and the handover selection message are preferably transmitted after step S12 is conducted.

However, in case the other electronic device 200 or 300 sends a handover request message to the first electronic device 100 during step S12 or before step S12, the first electronic device 100 may send a handover selection message to the other electronic device 200 or 300 in response to the handover request message before or during step S12. However, even in such case, it is preferable that step S12 is conducted so that only when a user requests connection via an alternative carrier, the handover selection message is sent to the other electronic device 200 or 300.

Meanwhile, the first electronic device 100 may display a window W3 inquiring both selection of an alternative carrier and whether to connect as shown in FIG. 19, rather than separately asking a user whether to connect via an alternative carrier from selection of an alternative carrier to be connected by displaying different windows W1 and W2 as shown in FIGS. 17 and 18.

Subsequently, the first electronic device 100 may store (register) the alternative carrier selected in step S13, together with the identifier of the other electronic device 200 or 300 received in step S11, with the selected alternative carrier matching the identifier of the other electronic device 200 or 300 (S14). FIG. 20 illustrates a table in which identifiers of electronic devices are matched with their associated alternative carriers according to a fifth embodiment of the present invention. Referring to FIG. 20, Bluetooth is designated and stored as an alternative carrier for a TV, and Wi-Fi and Wi-HD are stored matching tablet 1 and a NAS (Network Attached Storage), respectively. Meanwhile, each electronic device need not be designated and match only one alternative carrier, and one electronic device may be designated with a plurality of alternative carriers as shown in FIG. 20 where tablet 2 is designated with Bluetooth and Wi-Fi as alternative carriers. In case a plurality of alternative carriers are designated as such, the above-described embodiments may apply so that one of the plurality of alternative carriers may be selected thus forming an alternative carrier link between the first electronic device 100 and the electronic device. Or, a plurality of links may be formed through all of the plurality of alternative carriers designated.

Subsequently, the first electronic device 100 may form a link with the other electronic device 200 or 300 through the alternative carrier selected in step S13 (S15). At this time, in case a specific operation and/or function should be done in the other electronic device 200 or 300 so that a link may be formed via an alternative carrier between the first electronic device 100 and the other electronic device 200 or 300, the first electronic device 100 may send, to the other electronic device 200 or 300, a control signal that enables the other electronic device 200 or 300 to perform the specific operation and/or function. For example, the first electronic device 100 may inform the type of an alternative carrier to form a link with the other electronic device 200 or 300 to the other electronic device 200 or 300 and may send a control signal that enables the other electronic device 200 or 300 to activate a module for forming a link via an alternative carrier.

Meanwhile, if a registration process on the other electronic device 200 or 300 is performed in step S14, the first electronic device 100 may send an identifier of the first electronic device 100 to the other electronic device 200 or 300. As such, when receiving the identifier of the first electronic device 100, the other electronic device 200 or 300 may be aware that the other electronic device 200 or 300 has been registered on the first electronic device 100, and when forming an NFC link with the first electronic device 100 and receiving the identifier of the first electronic device 100, might not send a handover request message to the first electronic device 100.

If a registration process on the other electronic device 200 or 300 is performed in steps S13 and S14, in case the first electronic device 100 and the other electronic device 200 or 300 forms an NFC link in the future, step S17 may be fulfilled without going through steps S13 and S14. That is, the first electronic device 100 may identify an alternative carrier matched thereto based on the identifier of the other electronic device 200 or 300 referring to the table shown in FIG. 20 and may form a link with the other electronic device 200 or 300 via the identified alternative carrier (S17).

By doing so, the first electronic device 100 may transmit and receive data to/from the other electronic device 200 or 300 using the link formed through the other alternative carrier than the NFC link (S16).

According to the fifth embodiment of the present invention, a more user-friendly user interface environment may be offered by selecting an alternative carrier based on a user's entry. Further, an alternative carrier for each electronic device is registered/stored, and thus, in case the two electronic devices form an NFC link in the future, no separate process for user entry needs to be performed, and transmission/reception of a handover request/selection message for handover is not required.

Next, a method of operating an electronic device according to a sixth embodiment of the present invention is described with reference to FIGS. 21 to 24.

Figure 21:
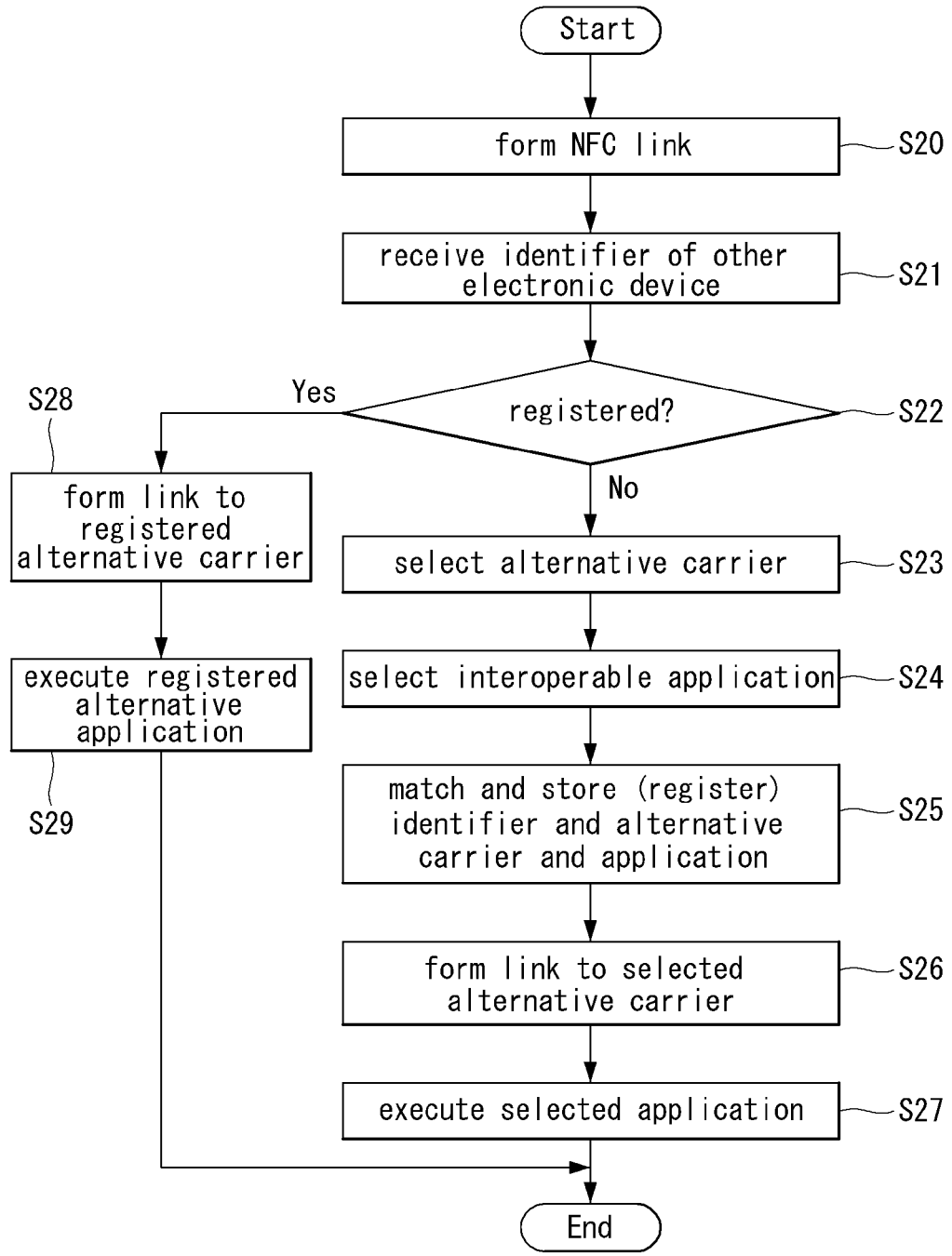
FIG. 21 is a flowchart illustrating a method of operating an electronic device according to a sixth embodiment of the present invention.

FIG. 21 is a flowchart illustrating a method of operating an electronic device according to a sixth embodiment of the present invention. Hereinafter, the other electronic device is by way of example the second electronic device 200 or third electronic device 300 as an example like in the fifth embodiment described above.

Referring to FIG. 21, the method of operating an electronic device according to a sixth embodiment of the present invention may include forming an NFC link between the first electronic device 100 and the other electronic device 200 or 300 (S20), receiving an identifier of the other electronic device 200 or 300 connected via the NFC link (S21), and determining whether the connected other electronic device 200 or 300 is pre-registered based on the received identifier (S22).

If it is determined in step S22 that the connected other electronic device 200 or 300 is not pre-registered, the first electronic device 100 may perform at least one of selecting an alternative carrier (S23), selecting an application to be interoperated (S24), storing (registering) the identifier received in step S21, with the identifier matching the selected carrier and the interoperating application (S25), forming a link with the other electronic device 200 or 300 via the selected alternative carrier (S26), or executing the selected application (S27).

If it is determined in step S22 that the connected other electronic device 200 or 300 is pre-registered, the first electronic device 100 may perform at least one of identifying the pre-registered to form a link with the other electronic device 200 or 300 via the registered alternative carrier (S28) and performing the registered interoperating application (S29).

Each step in the method of operating an electronic device according to the sixth embodiment of the present invention is now described in greater detail. Steps S20, S21, S22, and S23 are the same or substantially the same as steps S10, S11, S12, and S13, respectively, of the method according to the fifth embodiment, and a detailed description thereof is skipped, with a description focusing primarily on steps S24 to S29.

The first electronic device 100 may select an application to be interoperated when transmitting and receiving data to/from the other electronic device 200 or 300 via a link connected through the alternative carrier selected in step S23 with the other electronic device 200 or 300 (S24).

In conducting step S24, the first electronic device 100 may display through the display unit 151 a window W4 for providing a candidate application list that may interoperate in communication with the other electronic device 200 or 300 among various applications installed in the first electronic device 100. Accordingly, a user may pick up one or more application from the provided candidate application list. The first electronic device 100 may select the application chosen from the list as an application to be interoperated with the other electronic device 200 or 300.

The first electronic device 100 may generate a list of interoperable applications by various methods.

First, the first electronic device 100 may include all of the applications installed in the first electronic device 100 in the list.

Second, the first electronic device 100 may include only applications used for communication with the other electronic device 200 or 300 among the whole applications installed in the first electronic device 100 in the list.

Figure 22:
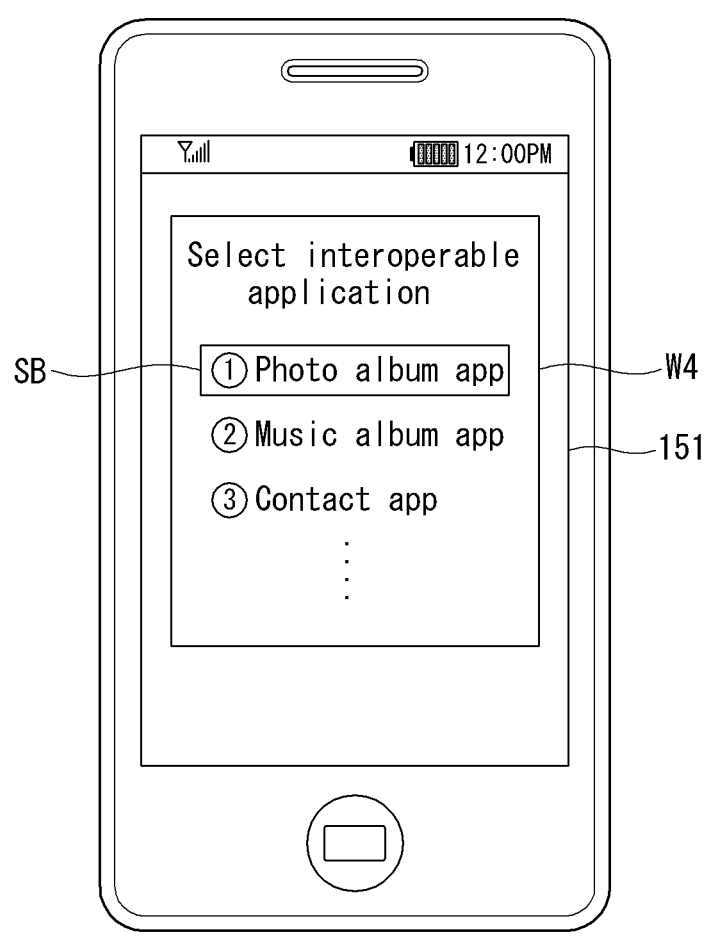
FIGS. 22 and 23 are views illustrating a method of selecting an interoperating application based on a user's entry according to the fifth embodiment of the present invention.
Figure 23:
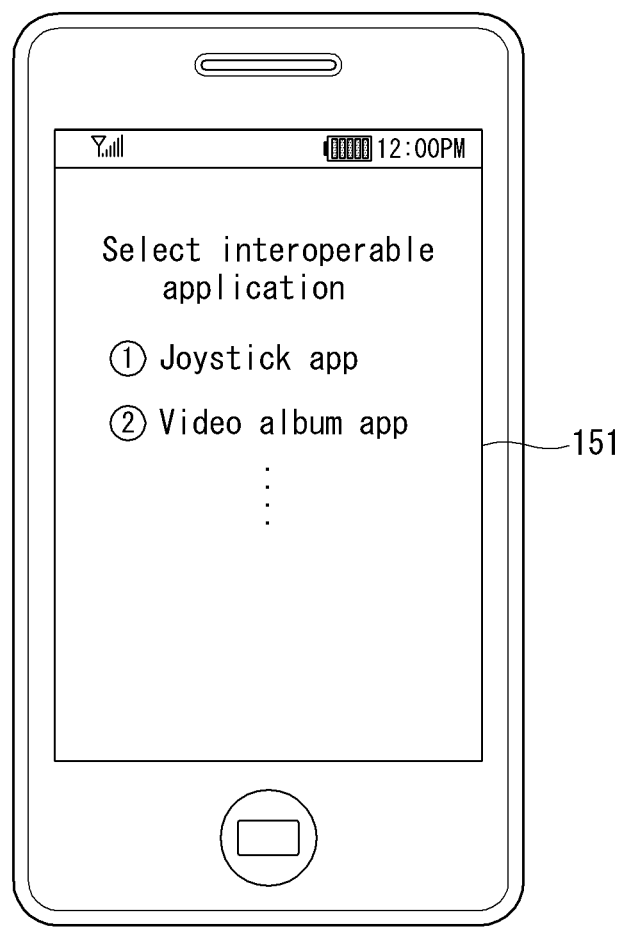

Third, different applications may be included in the list depending on the other electronic device 200 or 300 to be connected with the first electronic device 100 based on the identifier received in step S21. That is, the first electronic device 100 may identify characteristics of the other electronic device 200 or 300 and include applications more appropriate for the characteristics of the other electronic device 200 or 300 in the list depending on the characteristics. For example, in case the other electronic device 200 or 300 is verified to be an electronic device having a relatively small size, such as a tablet PC, a smartphone, a laptop computer, or a PC, applications such as a picture album application, a music album application, or a contact application, may be contained in the list as shown in FIG. 22. As another example, in case the other electronic device 200 or 300 is verified to be an electronic device having a relatively large size, such as a TV, applications such as a joystick application or a video album application, may be included in the list, as shown in FIG. 23. Meanwhile, the lists that may be created depending on the type of the other electronic device 200 or 300 as illustrated in FIGS. 22 and 23 are merely an example, and any other examples may also be available. At this time, the joystick application refers to an application to display, on, e.g., the first electronic device 100, an interface for user manipulation for a game application that is being executed on the other electronic device 200 or 300.

Fourth, different candidate applications may be included in the list depending on the alternative carrier selected in step S24. That is, the first electronic device 100 may verify the characteristics of the selected alternative carrier and may then include in the list applications more appropriate for the characteristics of the other electronic device 200 or 300 depending on the characteristics. For example, in case the selected alternative carrier is a low-speed data communication means such as Bluetooth, applications associated with low-capacity data such as a contact application, may be included in the list. As another example, in case the selected alternative carrier is a high-speed data communication means such as Wi-HD, applications associated with high-capacity data such as a video album application may be included in the list.

Subsequently, the first electronic device 100 may store (register) the interoperating application and alternative carrier selected in steps S23 and S24 together with the identifier of the other electronic device 200 or 300 received in step S21, with the alternative carrier and interoperating application matching the identifier (S25). FIG. 24 shows an example table in which an identifier of an electronic device matches its associated alternative carrier according to the sixth embodiment of the present invention. Referring to FIG. 24, an alternative carrier corresponding to each electronic device is the same as what is described above in connection with FIG. 20. Further, referring to FIG. 24, it can be seen that an application is also stored matching each electronic device. That is, a picture album application, a joystick application, a music album and video album application, and a video album application are stored matching a TV, tablet 1, tablet 2, and an NAS, respectively.

Simultaneously with step S25 or before or after step S25, the first electronic device 100 may form a link with the other electronic device 200 or 300 via the alternative carrier selected in step S23 (S26). This is similar to step S15 that has been described above in connection with the fifth embodiment, and its detailed description is skipped.

Next, the first electronic device 100 may execute the interoperating application selected in step S23 (S27). If there is another application that should be executed on the other electronic device 200 or 300 in interoperation with an application executed on the first electronic device 100 when the first electronic device 100 runs the selected interoperating application (hereinafter, referred to as "the other application"), the first electronic device 100 may send, to the other electronic device 200 or 300, a control signal that enables the other application to be executed on the other electronic device 200 or 300.

After the registration process on the other electronic device 200 or 300 is performed through steps S23 to S25, in case the first electronic device 100 and the other electronic device 200 or 300 form an NFC link in the future, step S28 may be immediately conducted without going through steps S23 to S25. That is, the first electronic device 100 may identify an alternative carrier matching the identifier of the other electronic device 200 or 300 received in step S21 based on the identifier by referring to the table shown in FIG. 24 and may form a link with the other electronic device 200 or 300 through the identified alternative carrier (S17). Further, the first electronic device 100 may identify an application matching the other electronic device 200 or 300 and may execute the identified application (S29).

According to the sixth embodiment of the present invention, an alternative carrier and/or interoperating application is selected based on a user's entry, thus providing for a more user-friendly user interface environment. Further, an alternative carrier and an interoperating application are registered/stored per electronic device, so that in case two electronic devices form an NFC link in the future, no separate process for user entry is required, and the burden of transmitting and receiving a handover request/selection message for handover may be eliminated. Further, in case a link is formed by an alternative carrier, an application to be executed may be automatically put to execution, thus eliminating the need of separately running an application.

Various embodiments disclosed herein may be implemented alone or in combination. Further, the steps constituting each embodiment may be combined with the steps constituting other embodiment. For example, the handover protocols described above in connection with FIGS. 2 to 5 may be combined with each other. Further, the handover collision protocols described herein are apparent to be applicable to each handover protocol described above in connection with FIGS. 2 to 5. While the handover protocols are in execution, the fifth embodiment and/or the sixth embodiment disclosed herein may be fulfilled in conjunction therewith.

While embodiments of the present invention have been described, it will be understood by one of ordinary skill in the art that various changes in form and detail may be made thereto without departing from the scope of the present invention defined by the following claims.

The present invention may provide an electronic device and a method of operating the same, which may enable effective handover from an NFC link to an alternative communication link by resolving a handover request collision.

The present invention provides the following effects.

First, an alternative carrier is chosen based on a user's entry, thus providing a more user-friendly user interface environment.

Second, an alternative carrier for each electronic device is registered/stored. Accordingly, in case two electronic devices form an NFC link in the future, no separate procedure for user entry is required, and there is no need of being supposed to transmit and receive a handover request/selection message for handover.

Third, an alternative carrier and/or an interoperating application is selected based on a user's entry. Accordingly, a user interface environment familiar to the user may be offered.

Finally, in case a link is established by an alternative carrier, an application to be run may be executed automatically, thus eliminating the need of being supposed to separately run the application.

What is claimed is:

1. A method of operating a first electronic device including a controller and a display unit, the method comprising:
receiving, via the controller, an identifier of a second electronic device from the second electronic device via a communication link formed by a first communication carrier;
checking, via the controller, whether the second electronic device is pre-registered based on the received identifier of the second electronic device;
transmitting, via the controller, when the second electronic device is not pre-registered according to a result of the checking, a first handover request message including alternative carriers to the second electronic device,
wherein the alternative carriers are supported by the first electronic device and are listed by priority in the first handover request message;
receiving, via the controller, a handover selection message including a second communication carrier,
wherein the second communication carrier is supported by the second electronic device and is selected among the alternative carriers;
forming, via the controller, a communication link with the second electronic device through the second communication carrier;
storing, via the controller, the second communication carrier matching with the second electronic device;
displaying, via the display unit, a second user interface providing a list including candidate applications installed in the first electronic device,
wherein the candidate applications are determined depending on display size of the second electronic device;
receiving, via the controller, a selection input for selecting an application among the candidate applications in the list of the displayed second user interface;
executing, via the controller, the selected application to be interoperated with the second electronic device; and
storing, via the controller, the selected application matching with both the second electronic device and the second communication carrier.

2. The method of claim 1, further comprising:
forming, when the second electronic device is pre-registered according to the result of the checking, a communication link with the second electronic device through a pre-stored second communication carrier matching with the second electronic device.

3. The method of claim 1, further comprising:
when receiving a second handover request message including alternative carriers supported by the second electronic device from the second electronic device, comparing a first field value included in the first handover request message with a second field value included in the second handover request message.

4. The method of claim 3, further comprising:
when the first field value is greater than the second field value, waiting for the handover selection message from the second electronic device; and
when the first field value is less than the second field value, transmitting response message in response to the second handover request message to the second electronic device.

5. The method of claim 4, wherein the first field value is a random number generated by the first electronic device and the second field value is a random number generated by the second electronic device.

6. The method of claim 1, further comprising:
displaying, when the second communication carrier includes a plurality of carriers, a first user interface providing the plurality of the carriers as the second communication carrier;
receiving a selection input for selecting one carrier among the plurality of the carriers;
forming a communication link with the second electronic device through the selected one communication carrier; and
storing the selected one carrier matching with the second electronic device.

7. The method of claim 1, further comprising:
assigning priorities to the alternative carriers based on a number of times by which the alternative carriers are used or an application is being executed.

8. A first electronic device comprising:
a communication unit configured to communicate with a second electronic device;
a storage unit configured to store information;
a display unit configured to display information; and
a controller configured to:
receive an identifier of the second electronic device from the second electronic device via a communication link formed by a first communication carrier,
check whether the second electronic device is pre-registered based on the received identifier of the second electronic device,
transmit, when the second electronic device is not pre-registered according to a result of the checking, a first handover request message including alternative carriers to the second electronic device, wherein the alternative carriers are supported by the first electronic device and are listed by priority in the first handover request message, receive a handover selection message including a second communication carrier, wherein the second communication carrier is supported by the second electronic device and is selected among the alternative carriers, form a communication link with the second electronic device through the second communication carrier, store the second communication carrier matching with the second electronic device, control the display unit to display a second user interface providing a list including candidate applications installed in the first electronic device, wherein the candidate applications are determined depending on display size of the second electronic device, receive a selection input for selecting an application among the candidate applications in the list of the displayed second user interface, execute the selected application to be interoperated with the second electronic device, and store the selected application matching with both the second electronic device and the second communication carrier.

9. The first electronic device of claim 8, wherein the controller is further configured to:

form, when the second electronic device is pre-registered according to the result of the checking, a communication link with the second electronic device through a pre-stored second communication carrier matching with the second electronic device.

10. The first electronic device of claim 8, wherein the controller is further configured to:

when receiving a second handover request message including alternative carriers supported by the second electronic device from the second electronic device, compare a first field value included in the first handover request message with a second field value included in the second handover request message.

11. The first electronic device of claim 10, wherein the controller is further configured to:

when the first field value is greater than the second field value, wait for the handover selection message from the second electronic device, and when the first field value is less than the second field value, transmit response message in response to the second handover request message to the second electronic device.

12. The first electronic device of claim 11, wherein the first field value is a random number generated by the first electronic device and the second field value is a random number generated by the second electronic device.

13. The first electronic device of claim 8, wherein the controller is further configured to:

control the display unit to display, when the second communication carrier includes a plurality of carriers, a first user interface providing the plurality of the carriers as the second communication carrier, receive a selection input for selecting one carrier among the plurality of the carriers, form a communication link with the second electronic device through the selected one communication carrier, and store the selected one carrier matching with the second electronic device.

14. The first electronic device of claim 8, wherein the controller is further configured to:

assign priorities to the alternative carriers based on a number of times by which the alternative carriers are used or an application is being executed.

* * * * *